US007237061B1

(12) United States Patent
Boic

(10) Patent No.: US 7,237,061 B1
(45) Date of Patent: Jun. 26, 2007

(54) SYSTEMS AND METHODS FOR THE EFFICIENT READING OF DATA IN A SERVER SYSTEM

(75) Inventor: Milko Boic, Bellevue, WA (US)

(73) Assignee: RealNetworks, Inc., Seattle, WA (US)

( * ) Notice: Subject to any disclaimer, the term of this patent is extended or adjusted under 35 U.S.C. 154(b) by 735 days.

(21) Appl. No.: 10/418,967

(22) Filed: Apr. 17, 2003

(51) Int. Cl.
*G06F 12/02* (2006.01)

(52) U.S. Cl. ..................................... 711/113
(58) Field of Classification Search ............... 711/113, 711/133, 134
See application file for complete search history.

(56) References Cited

U.S. PATENT DOCUMENTS

| | | | | |
|---|---|---|---|---|
| 4,414,644 A | * | 11/1983 | Tayler ........................ | 711/162 |
| 4,928,239 A | * | 5/1990 | Baum et al. ................ | 711/136 |
| 4,980,823 A | * | 12/1990 | Liu ............................ | 711/136 |
| 6,988,169 B2 | * | 1/2006 | Burger et al. ............... | 711/137 |

OTHER PUBLICATIONS

IBM TDB, "Biased Partitioned LRU Cache Replacement Control", May 1977, vol. 19, Issue 12, p. 4697.*
IBM TDB, "Frequently Used Data Flush Avoidance In Cache Backing Store", Mar. 1979, vol. 21, Issue 10, p. 4199.*

* cited by examiner

*Primary Examiner*—Kevin L. Ellis
(74) *Attorney, Agent, or Firm*—Knobbe Martens Olson & Bear LLP

(57) ABSTRACT

The invention is related to methods and apparatus that efficiently store and read data in a cache for a server system, such as a media server. The cache stores data for file formats of a streamable file format, such as an MPEG-4 file format. Relatively frequently accessed portions of a streamable file format are maintained with long-life links. For example, selected child atoms of sample table atoms of MPEG-4 file formats can be relatively frequently accessed during the streaming of a media presentation. A virtual address space manager for selected child atoms maintains relatively long-life links to pages or segments of data in a cache that hold data corresponding to these child atoms and can advantageously inhibit the release of these segments to enhance a hit rate for the cache and decrease an amount of thrashing, i.e., repeated paging of data to the cache.

68 Claims, 17 Drawing Sheets

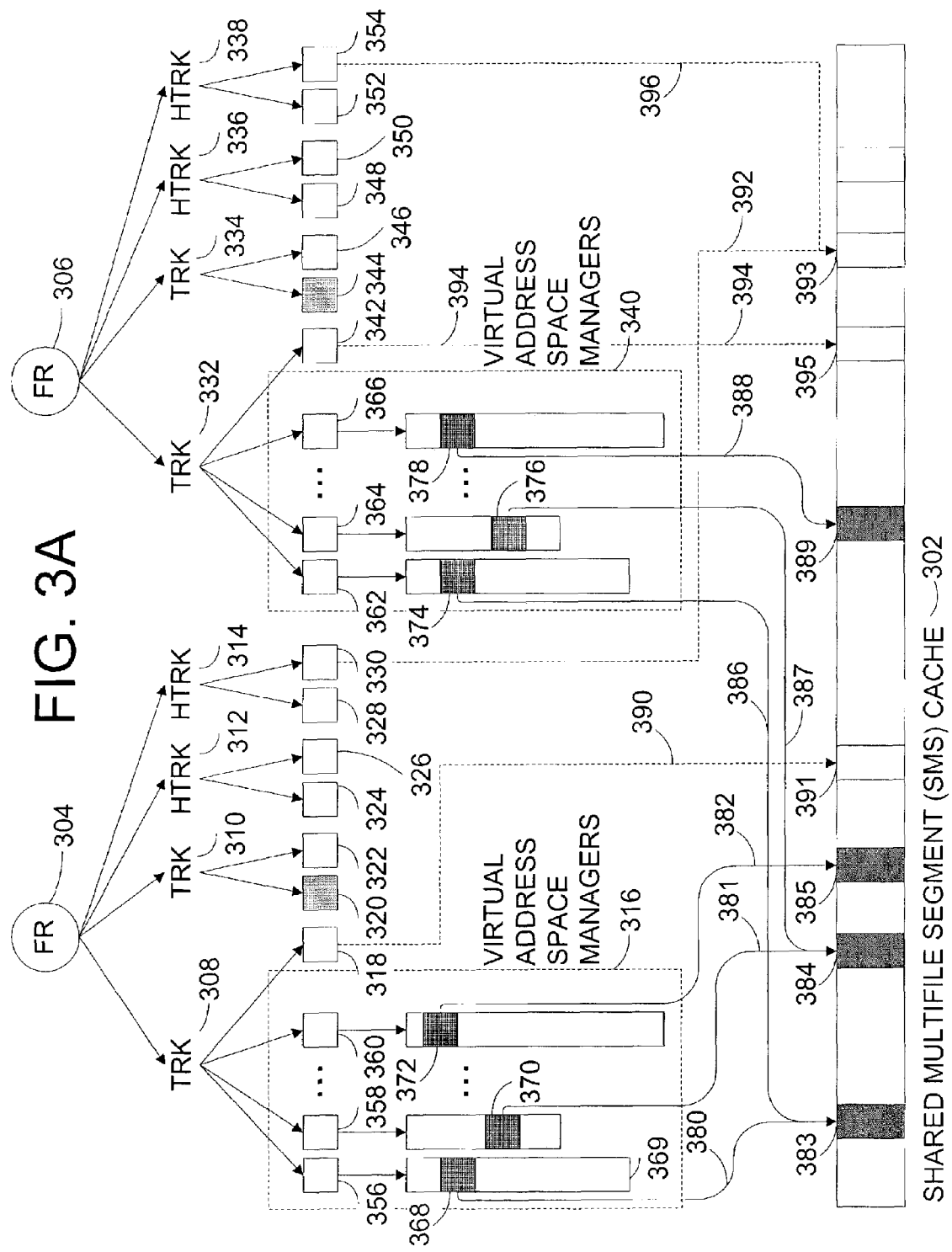

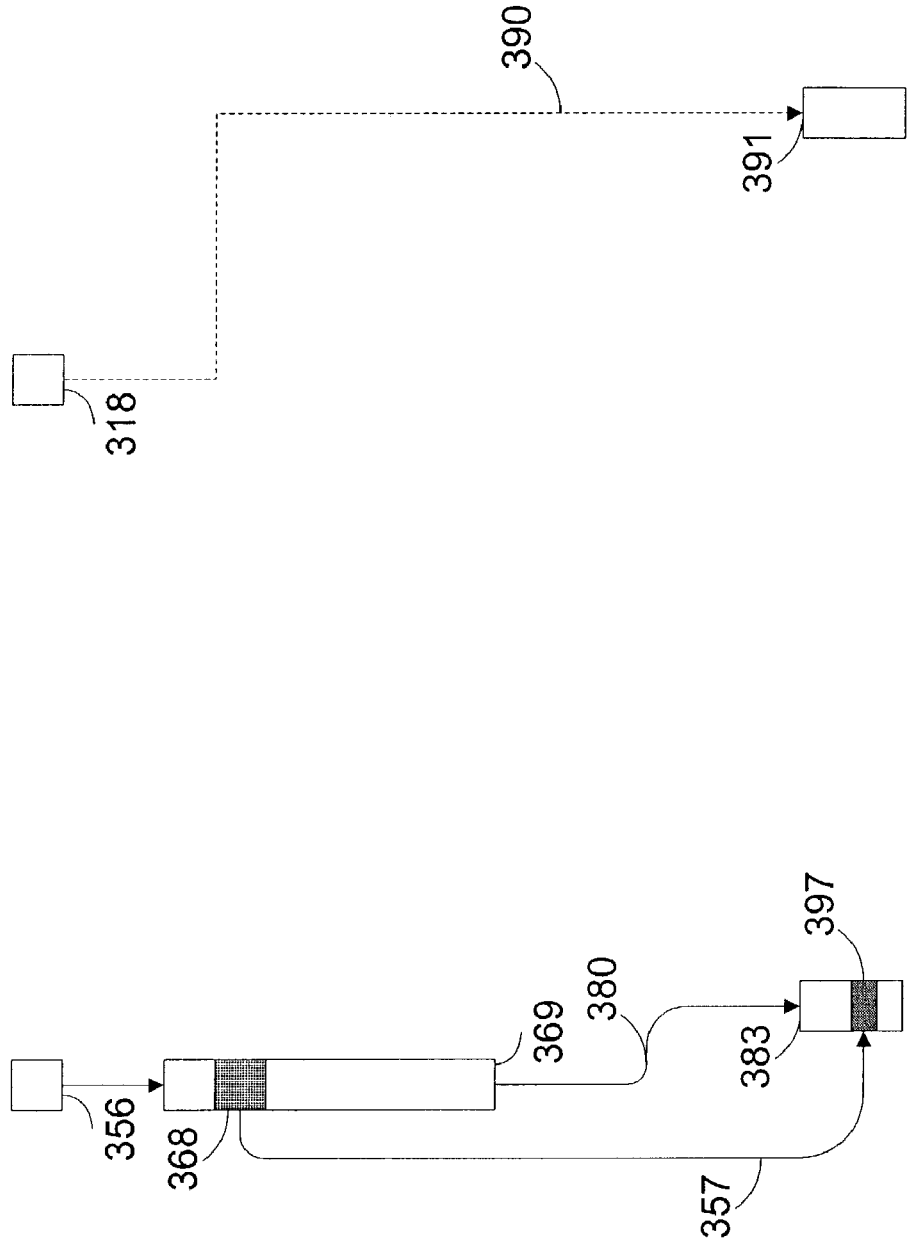

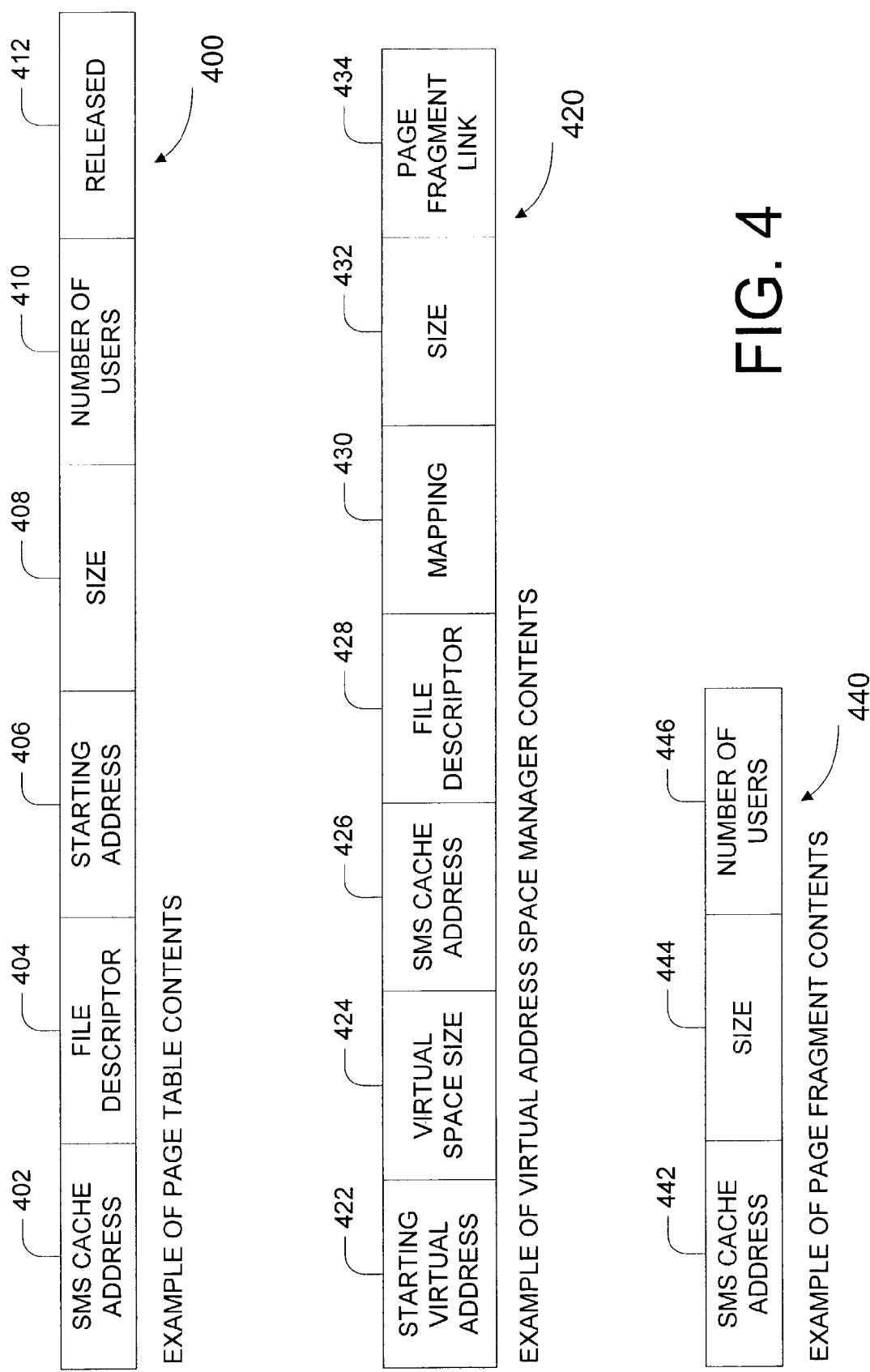

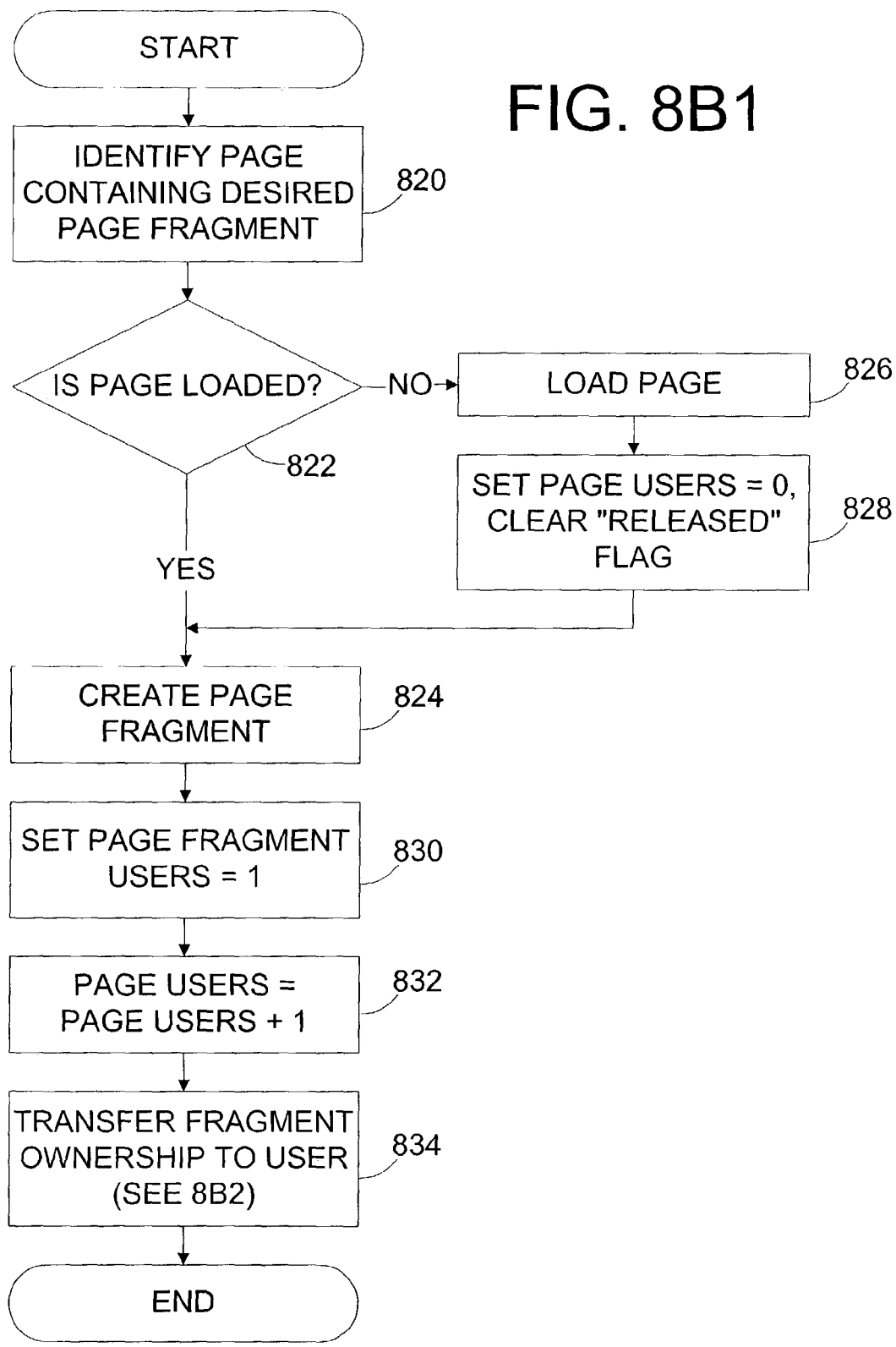
FIG. 8B1

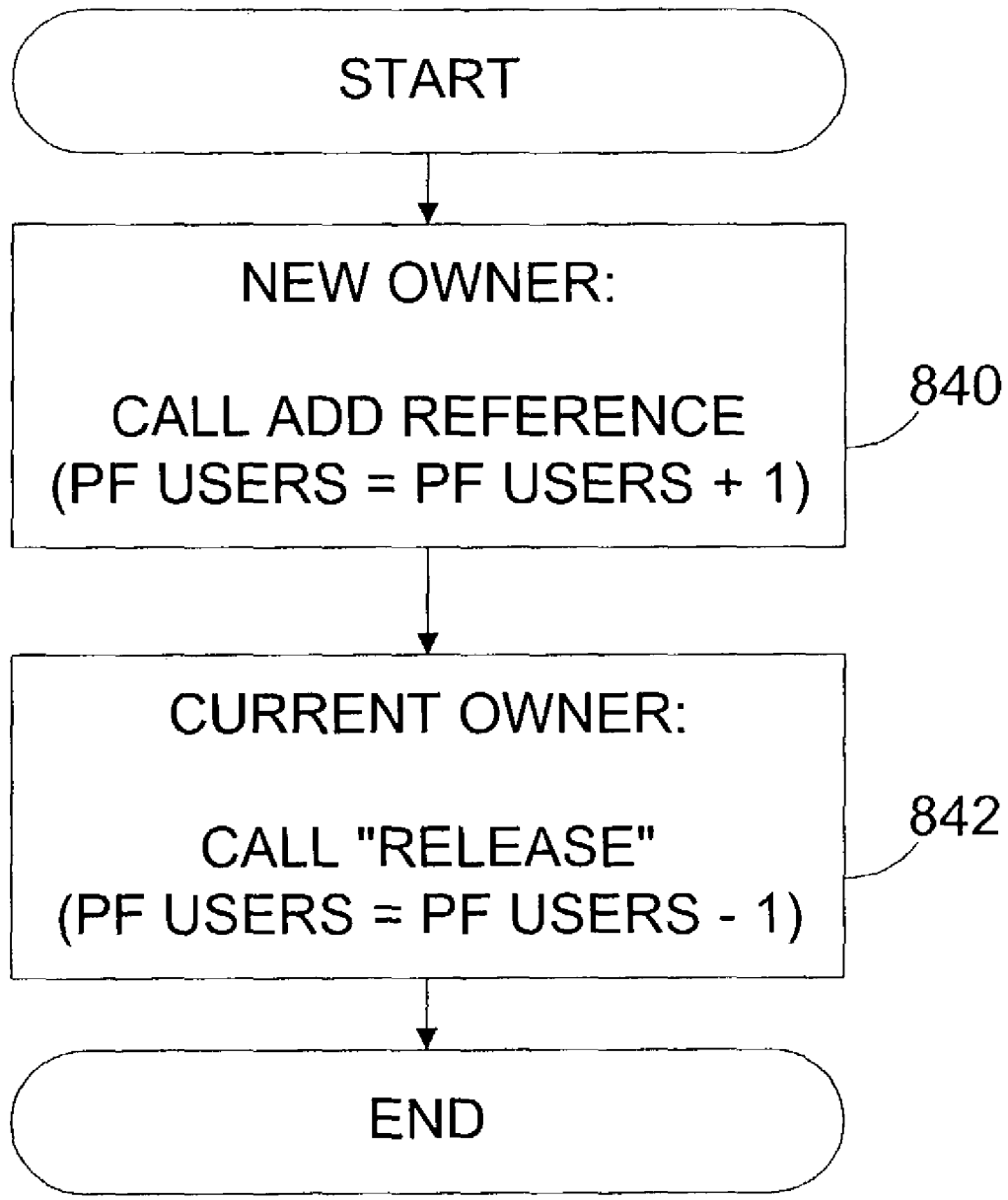
FIG. 8B2

SYSTEMS AND METHODS FOR THE
EFFICIENT READING OF DATA IN A
SERVER SYSTEM

BACKGROUND OF THE INVENTION

1. Field of the Invention

The invention generally relates to computer systems. In particular, the invention relates to caching in a computer system.

2. Description of the Related Art

Audio compression and video compression techniques have made it practical to send media presentations over a digital network, such as over the Internet. In addition to media clips, a computer server can be used to serve a variety of other types of information, such as advertisements, news articles, database files, software upgrades, and the like, to a user.

Typically, the data for the files is stored in a source of mass storage, such as in hard disks, redundant arrays of inexpensive disks (RAID), optical disks, and the like. However, mass storage devices are typically relatively slow, and thus data is often cached in relatively fast solid state memory, such as random access memory ("RAM" or "memory"). Examples of memory include static RAM (SRAM) and dynamic RAM (DRAM). With caching, a portion of the data stored in mass storage is copied to and retrieved from the memory cache ("cache").

Despite advances in compression technology, such as MPEG-4 video compression technology, media data files remain relatively large in size. In addition, a server system, such as a media server, typically stores data for a vast number of media presentations, such as video clips and music clips. In relatively low-cost systems, it can be impractical to provide a cache that is as large as the amount of data stored in the mass storage, i.e., the cache is typically smaller than the mass storage. Thus, the data that is requested is not always present in the cache.

A cache "hit" occurs when the data is available from the cache, and the system retrieves the data from the relatively fast cache rather than from the relatively slow mass storage. A cache "miss" occurs when the data is not available from the cache, and the system retrieves the data from the mass storage. It will be understood that a system can be configured to retrieve data for a cache miss directly from the mass storage or from the mass storage via a read of the mass storage by a cache controller.

Conventional techniques of cache management are inadequate. The relatively low "hit" rate of existing cache systems results in frequent paging of data to the cache, relatively high latency due to waiting for data to be read from the mass storage, and relatively high CPU usage to manage the cache misses. Conventional cache management techniques provide a relatively low cache hit rate for selected types of files, such as for MPEG-4 files, and fail to exploit the full potential of the cache.

BRIEF DESCRIPTION OF THE DRAWINGS

These and other features of the invention will now be described with reference to the drawings summarized below. These drawings and the associated description are provided to illustrate preferred embodiments of the invention and are not intended to limit the scope of the invention.

FIG. 3A illustrates an architecture for a shared multifile segment (SMS) cache according to an embodiment of the invention.

FIG. 3B illustrates one example of a long-term link for the SMS cache of FIG. 3A.

FIG. 3C illustrates one example of a short-life link for the SMS cache of FIG. 3A.

FIG. 4 illustrates an example of a data structure for managing the SMS cache of FIG. 3A, a structure for a virtual address space manager, and a structure for a pointer.

FIG. 8B1 is a flowchart that generally illustrates accessing a page or segment in the SMS cache of FIG. 3A with a page fragment object.

FIG. 8B2 is a flowchart that generally illustrates a transfer of ownership for a page fragment object.

DETAILED DESCRIPTION OF PREFERRED EMBODIMENTS

Although this invention will be described in terms of certain preferred embodiments, other embodiments that are apparent to those of ordinary skill in the art, including embodiments that do not provide all of the benefits and features set forth herein, are also within the scope of this invention. Accordingly, the scope of the invention is defined only by reference to the appended claims.

Mass Storage Cache

Figure 1:
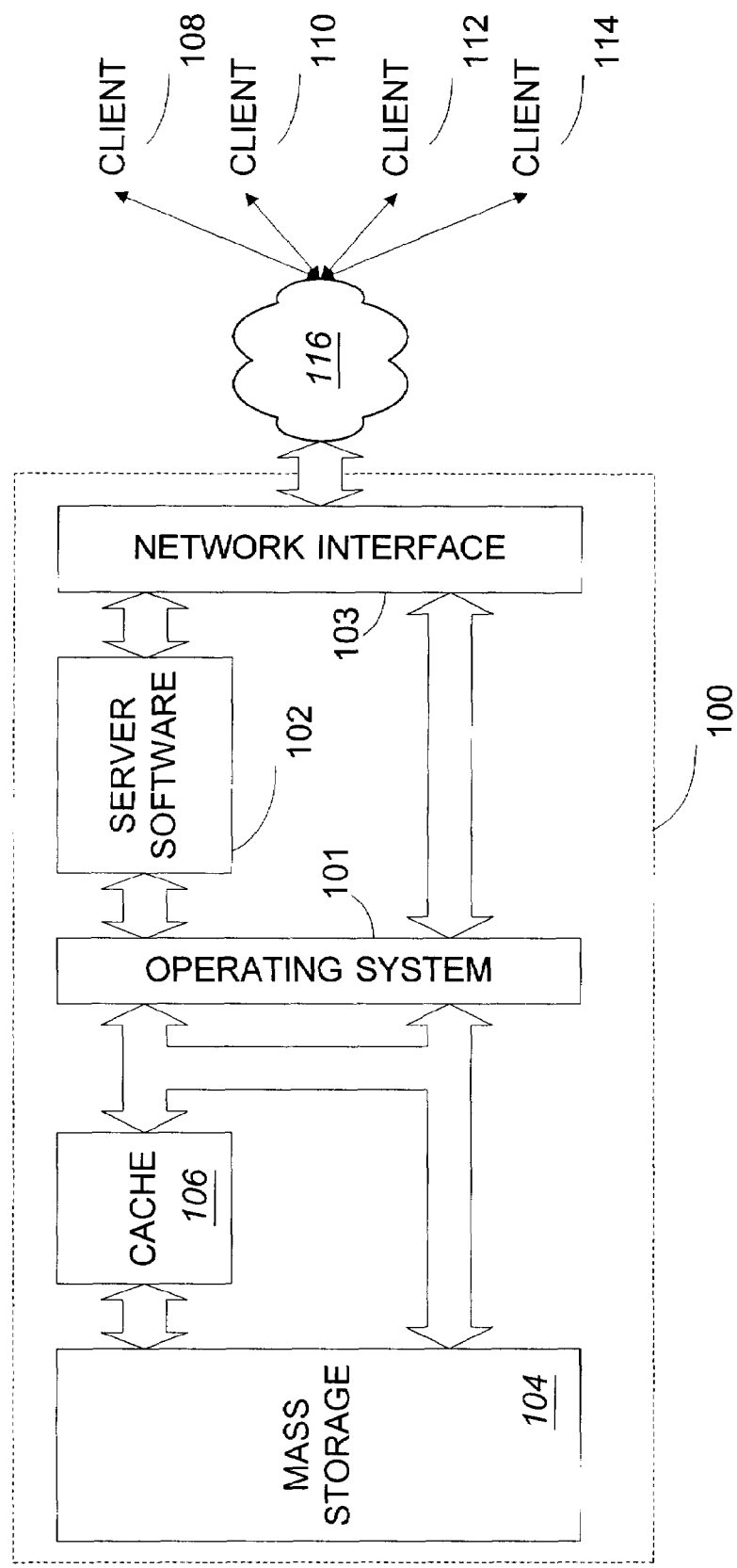
FIG. 1 illustrates a computer architecture with a mass storage cache.

FIG. 1 illustrates a block diagram of a server system 100 with a mass storage cache. The server system 100 includes an operating system 101, server software 102, a network interface 103, mass storage 104, and a cache 106. The operating system 101 and the server software 102 can be executed by one or more CPUs. It will be understood that in another embodiment, the operating system 101 and the server software 102 can be integrated. The network interface 103 communicates with one or more clients 108, 110, 112, 114 via a network 116. As will be described in greater detail later in connection with FIG. 2A, data from the mass storage 104 or from the cache 106 can be provided to the network interface 103 via the operating system 101 or via the server software 102. The network 116 can correspond to a wide variety of networks, including local area networks, wide area networks, wired networks, wireless networks, the Internet, and the like.

Data for the server system 100 can be stored in the mass storage 104. Examples of mass storage 104 include hard disks, redundant arrays of inexpensive disks (RAID), optical disks, tape drives, and the like. Although the mass storage 104 can store relatively large amounts of non-volatile data, the mass storage 104 can be relatively slow to provide access to stored data. For example, the data transfer rate for the mass storage 104 can be relatively low. In addition, access to stored data from the mass storage 104 can include latency. For example, it can take tens of milliseconds for a servo to move a read head to the track of a hard disk platter that stores the desired data, and for the portion of the track with the data to rotate to the read head. During this latency period, the desired data is not available from the mass storage 104. To speed access to data stored in the mass storage 104, data can be retrieved from the cache 106 when available.

The cache 106 stores a copy of a portion of the data stored in the mass storage 104. In one embodiment, relatively fast solid-state memory forms the cache 106. Examples of memory include static RAM (SRAM) and dynamic RAM (DRAM). A cache formed from memory can be significantly faster than mass storage. For example, in one embodiment, the access of data from cache corresponds to nanoseconds, which compares to milliseconds for access to data from mass storage. It will be understood by one of ordinary skill in the art that the server system 100 can include other layers of cache. For example, a CPU can have an internal cache, a motherboard can also have a cache, and a mass storage device such as a hard disk can also include an internal cache.

The cache 106 is typically much smaller than the mass storage 104. In one embodiment, the cache 106 can correspond to about 1 gigabyte of memory space, and the mass storage 104 can correspond to terabytes of memory space. The operating system 101 can retrieve the data from the cache 106 when there is a cache hit. When there is a cache miss, the operating system 101 can retrieve the data directly from the mass storage 104 or from the mass storage 104 through the cache 106. Cache management techniques can determine which data is copied to the cache 106 and which data is replaced in the cache 106 to make room for new data in the cache, i.e., which data is purged. Data can be moved from the mass storage 104 to the cache 106 in pages or segments of memory, and the transfer of these pages of memory is known as "paging" or "swapping."

Efficient caching techniques can reduce latency and reduce the CPU load for the server system 100. For example, when efficient caching techniques provide a relatively high hit rate, the operating system 101 can advantageously retrieve data from the cache 106 with relatively infrequent access of data from the mass storage 104 and with relatively little of the CPU overhead associated with the paging of data to the cache 106. By contrast, with relatively inefficient caching techniques, the data can be relatively frequently unavailable from the cache 106, and the operating system 101 may repeatedly page data from the mass storage 104 to the cache 106. The repeated paging of data can waste CPU resources and can result in "thrashing" of the mass storage 104 due to repeated accesses. In addition, these effects of inefficient cache management techniques can decrease the amount of information that can be processed by the server system 100 as compared to efficient cache management techniques. For example, a server system with relatively efficient cache management may advantageously be able to stream data to relatively more clients or users than a server system that uses inefficient cache management techniques.

Streaming

Streaming techniques include data transfer techniques that permit a media clip to be played relatively soon after the media presentation is selected. With streaming, the selected data can be used, e.g., displayed or played, before all of the data for the media presentation is received or even generated. For example, this makes it practical for a media player to display a newscast or to play back a commentary of a sporting event in a live or nearly live manner. Streaming techniques also shorten the amount of time between selection of a media clip and the displaying or playing of the media clip. The data that is streamed can correspond to a variety of delivery protocols. Delivery protocols can be connectionless or connection-oriented. Examples of connectionless protocols include User Datagram Protocol (UDP) and Internet Packet Exchange (IPX). Examples of connection-oriented protocols include HTTP, Transmission Control Protocol/Internet Protocol (TCP/IP), and RealTime Streaming Protocol (RTSP).

One popular format for a media presentation is defined by the MPEG-4 format. Presentations encoded in MPEG-4 format are advantageously compact and can be streamed with relatively little occupied bandwidth. However, the MPEG-4 file format differs from conventional streaming formats, and an MPEG-4 file is not actually streamed over a transmission medium. Rather, the MPEG-4 file format corresponds to a "streamable format" or a "base format." With a streamable format, a server system reads metadata from within the file to determine how to form packets to deliver the corresponding data over one or more specified delivery protocols. With respect to MPEG-4, the metadata instructs the server system 100 how to access the instructions on how to deliver the media data (hint track data) as well as how to access the media data (track data) that is referred to by the hint track data.

While illustrated in the context of caching MPEG-4 data for streaming, the skilled artisan will appreciate that the principles and advantages described herein are applicable to the caching of other types of data that are maintained in a streamable file format and use metadata stored in the file to instruct a server application how to deliver the corresponding data over a delivery protocol. For example, another example of a streamable file format or base format is QuickTime® format from Apple Computer, Inc. In addition, it will be apparent to those of ordinary skill in the art that the caching techniques disclosed herein can be applied to other types of streamable file formats or base formats, where identifiable portions of a file format are more frequently accessed than other portions of the same file.

MPEG-4 File Format

In an MPEG-4 file format, data for the presentation is divided into tracks. The number of tracks in an MPEG-4 file can vary in a very broad range. An MPEG-4 file can include zero or more visual tracks for video information. For example, an MPEG-4 file can include visual tracks for various layers of video, e.g., backgrounds, foregrounds, etc. The MPEG-4 file can include audio tracks for audio information. For example, there can be an audio track for a left channel, an audio track for a right channel, an audio track for another language, an audio track for commentary, and the like. Other types of information can be stored in other tracks, such as subtitles, backgrounds, and the like. Hint tracks provide instructions that can be read by the server system 100 to form packets from the media information stored in the file for streaming in a selected protocol. Multiple hint tracks for a single MPEG-4 file can exist, with each hint track indicating how to stream the media presentation over a selected delivery protocol.

Each track of an MPEG-4 file comprises a plurality of samples. Each sample corresponds to media data or information for a particular unit of time, such as for a frame of video. In the MPEG-4 file format, the samples are numbered to indicate their location in a sequence. To reduce interleaving within the MPEG-4 data file, the samples of a particular track can also be arranged into chunks, which are groups of contiguous samples for a track, such as, for example, contiguous 1-second groups of samples for the track. However, it will be appreciated by one of ordinary skill in the art that an MPEG-4 data file can include a considerable amount of data interleaving.

As illustrated above, a streamable file format, e.g., the MPEG-4 file format, differs in many respects from a conventional streaming format. Conventional caching techniques can be readily applied to data stored in conventional streaming formats because the data that is streamed can be the same as the data in a data file. For example, with a conventional streaming format, a media clip can be pre-packetized and stored in mass storage in the data packets that will be streamed to a client. However, conventional caching techniques can be relatively ineffective when caching data in a streamable file format. Conventional caching techniques typically rely on spatial and temporal locality to be effective. However, the spatial and temporal locality of data in streamable file formats differs from the spatial and temporal locality of data in conventional file formats.

Embodiments of the invention include systems and methods for caching data that is maintained in streamable file formats, e.g., the MPEG-4 file format. The systems and methods described herein can advantageously provide caching with relatively high hit rates, thereby reducing system latencies in retrieving data from relatively slow mass storage devices. The systems and methods described herein can also advantageously reduce thrashing, i.e., reduce repeated paging or swapping of data into the cache. These efficient caching techniques reduce the load on the CPU and reduce system latencies, thereby advantageously permitting a relatively large number of clients to be served by the server system 100.

Metadata and Media Data in MPEG-4

A media file in the MPEG-4 file format includes metadata and media data. An example of an MPEG-4 file format will be described later in connection with FIG. 2A. The metadata and the media data are maintained in separate object-oriented structures called "atoms" or "boxes" that make up a media file. The term "atoms" will be used herein to describe these structures. In the MPEG-4 file format, the atoms can be recognized by unique type identifiers and lengths. The atoms can be further sub-divided into sub atoms or child atoms. A movie atom (moov) maintains a collection of atoms related to metadata. The metadata in the movie atom (moov) can relate to information about the media data or about other metadata. The media data itself can be maintained in one or more media data atoms (mdat).

The media tracks of a media file correspond to child atoms of the movie atom (moov). It will be understood that there can be many types of child atoms in the movie atom (moov) apart from the media tracks. The tracks of a movie atom (moov) do not contain the media content. Rather, the media tracks in movie atoms (moov) point to or link to the media data in media data atoms (mdat). Child atoms within the media tracks known as sample table atoms (stbl) store information that maps the media time to a sample number and a sample location, i.e., maps a media time to a memory address space. This information can be used to reference the time and data indexing of the media samples belonging to the track such that the desired portions of the media data atoms (mdat) can be located.

Sample table atoms (stbl) also have child atoms. Using the MPEG-4 file format as an example, a sample description atom (stsd) can provide codec information. Other child atoms of the sample table atom (stbl) include a chunk map atom (stsc), composition time atom (ctts), chunk offset atom (stco), key-frames atom (stss), decode time atom (stts), priority map atom (stdp), and a size map atom (stsz). In one embodiment, selected child atoms of sample table atoms are cached with "long-term" links, as will be explained in greater detail in connection with FIGS. 3A and 3B. In addition, there can be other child atoms of the sample table atoms as well. The child atoms that are optional and the child atoms that should be provided can be specified for a format by the applicable specification, e.g., MPEG-4, Quicktime®, etc. It will be understood that the sample table can further include other child atoms, and that other forms of streamable formats, such as QuickTime®, can include other types of child atoms in the sample table atom (stbl).

File Format Example

Figure 2A:
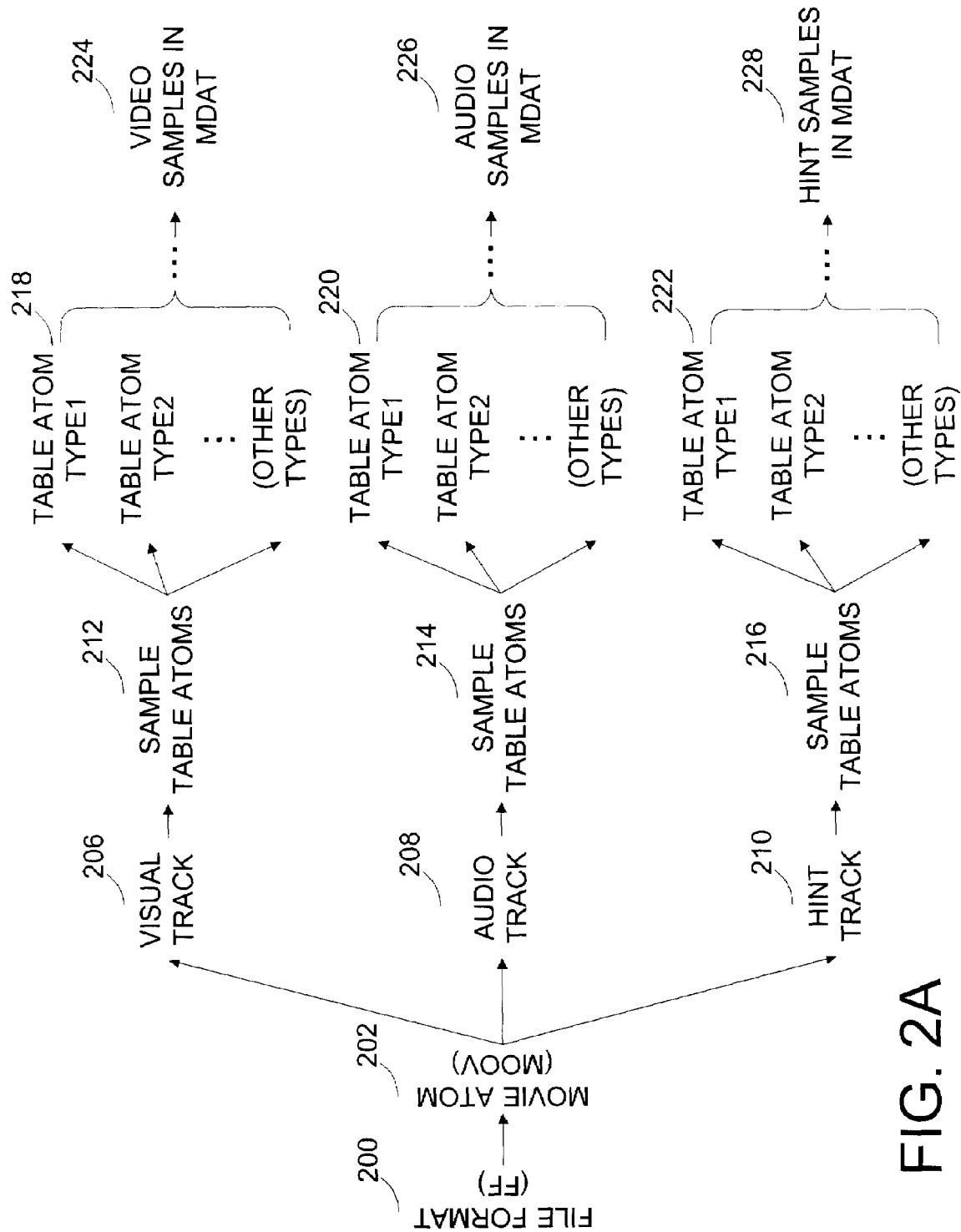
FIG. 2A illustrates an example of a file format in MPEG-4.

FIG. 2A illustrates an example of a file format 200 in MPEG-4. The file format 200 has been simplified for clarity. The file format 200 includes metadata and media data. The metadata is stored in a movie atom (moov) 202. The media data is stored in a media data atom (mdat) as indicated by video samples in mdat 224, audio samples in mdat 226, and hint samples in mdat 228. The media data in the media data atom (mdat) atom can be stored in a variety of ways, such as, for example, in one or more files, locally or remotely, and the like.

The movie atom (moov) 202 can include one or more tracks. In the illustrated example, the movie atom (moov) 202 includes a visual track 206, an audio track 208, and a hint track 210. It will be understood by one of ordinary skill in the art that the movie atom (moov) 202 can have additional tracks or can have fewer tracks than those shown in the illustrated example.

The visual track 206 includes metadata, which corresponds to information about the video samples in mdat 224 that belong to the visual track 206. The video samples in mdat 224 include information for frames. The visual track 206 can include one or more samples of metadata. These samples correspond to media data or to metadata for a particular unit of time, such as for a frame of video. In the MPEG-4 file format, the samples are numbered to indicate their location in a sequence. The visual track 206 includes sample table atoms (stbl) 212. The sample table atoms (stbl) 212 provide information to map the media time to a sample number and to a sample location such that the server system 100 can find and use the video samples in mdat 224 that belongs to the visual track 206. The sample table atoms (stbl) 212 can include a variety of table atom types 218. For example, in the MPEG-4 file format, the various types can include a key-frames atom (stss), a composition time atom (ctts), a decode time atom (stts), etc. It will be understood by one of ordinary skill in the art that the movie atom (moov) 202 can include additional visual tracks and in some presentations, may not even include a visual track.

The audio track 208 includes metadata corresponding to information about the audio samples in mdat 226 that belongs to the audio track 208. The audio samples in mdat 226 include audio data. The audio track 208 also includes sample table atoms (stbl) 214, which permit the server system 100 to map the media time to a sample number and to a sample location for audio samples in mdat 226. The sample table atoms (stbl) 214 can include a variety of table atom types 220. It will be understood by one of ordinary skill in the art that the movie atom (moov) 202 can include more than one audio track and can also not have an audio track. Further, the skilled practitioner will appreciate that there can be other types of tracks, such as tracks for subtitles, that also have a sample table atom.

The metadata stored in the hint track 210 provides instructions that can be read by the server system 100 to obtain instructions (hint data) on how to form packets for streaming from the media information maintained in the file. The hint track 210 also includes sample table atoms (stbl) 216 of various types 222. One or more hint tracks can be included to provide instructions for forming packets in one or more delivery protocols. The hint tracks possess sample table atoms in the same manner as the media tracks. The sample table atoms (stbl) 216 of the hint track 210 point to hint data, i.e., hint samples in mdat 228, which correspond to instructions on how to form packets for streaming from the media information maintained in the file. These instructions refer to media tracks, for example, to audio and to video tracks. It will be understood by one of ordinary skill in the art that reading of hint data using hint track meta-data and reading of media data using the media track meta-data is of the same nature and poses the same caching challenges.

Further examples of file formats for streamable formats or base formats can be found in the specifications for MPEG-4 and for QuickTime®. Although these streamable formats are advanced, the size of the associated data files can remain relatively large. For example, a relatively long movie presentation with relatively high resolution and relatively high frame rates can consume space on the order of gigabytes. However, the server system 100 typically retrieves only a relatively small fraction of the data file at a time. Embodiments of the invention can advantageously be adapted to efficiently cache relatively small portions of the media files, thereby permitting a relatively small-sized memory cache to provide relatively high cache hit rates for the streaming of data to a number of clients.

Data Retrieval

In one arrangement, the server system 100 retrieves the hint tracks from a media file. The server system 100 uses the hint tracks that correspond to a delivery protocol. In one embodiment, the server system 100 can be dedicated to a single delivery protocol. According to the instructions from the hint tracks, the server system 100 selects the media tracks from the media data (mdat) to form packets for streaming in the selected delivery protocol. The information retained in the sample table atoms (stbl) of the movie atom (moov) for the selected hint tracks and selected media tracks indicates where the server system 100 can find the corresponding hint data and the corresponding media data from the media data atoms (mdat).

In one embodiment, sample table atoms and hint track samples are read by file readers of the server software 102, and media data is read only by the operating system 101. File readers will be described in greater detail later in connection with FIG. 3A. In one embodiment, the server software 102 provides instructions to the operating system 101 so that the operating system 101 can retrieve the appropriate data fragments, glue the fragments together, and form packets, which are then provided to the network interface 103 for streaming to a client. In one example, the server software 102 reads the hint track sample table atoms to determine the location of hint data, which in turn is read by the server to determine media samples or portions of media samples used to form a packet. The server software 102 can then read the media track sample table atoms to locate the media data blocks. Instructions from the server software 102 to the operating system 101 specify page fragments which are then glued together to form packets and sent to the client via the network interface 103. A page fragment can be identified by the server software 102 by providing the operating system 101 with a pointer that includes, for example, a filename or a file descriptor, data offset within the file, and data size. Advantageously, such a configuration reduces the amount of data that passes through the user space occupied by the server software 102 and can advantageously increase the throughput of the server system 100.

Examples of States for in a Cache

Figure 2B:
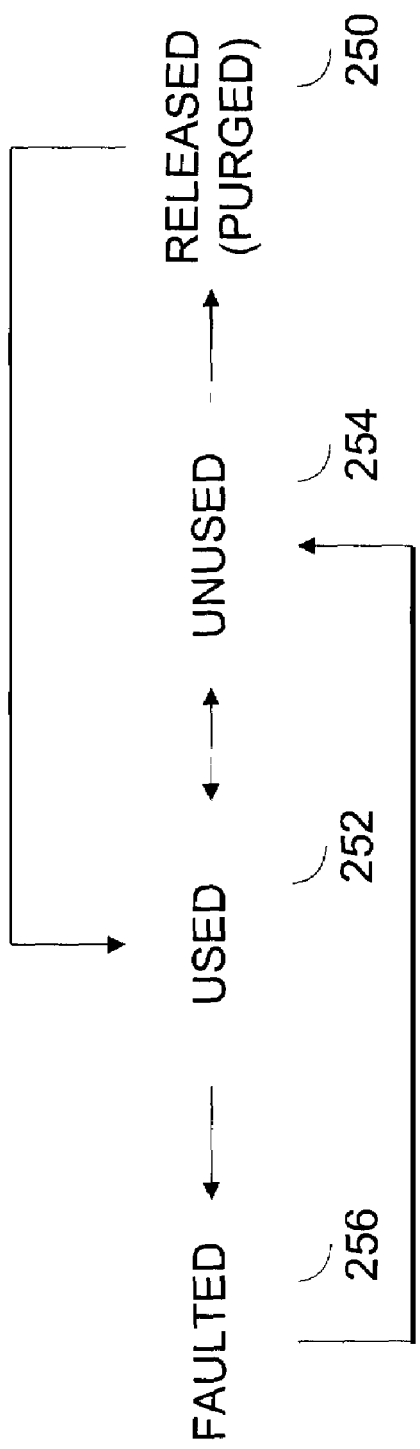
FIG. 2B illustrates one example of state transitions for a page or segment of memory in a cache.

FIG. 2B illustrates one example of possible states for a page or segment of memory in a cache. In FIG. 2B, a segment of memory in the cache can take on a released state 250, a used state 252, an unused state 254, or a faulted state 256. In the released state 250, the segment does not contain data and is available to be loaded with data from, for example, a mass storage device. When a segment is in the used state 252, the segment contains data and has a user count associated with the segment that is greater than zero. In one embodiment, the user count relates to a count of the number of software objects or components that use the segment and not to a computer user, such as someone watching a media presentation. In one embodiment, a software object uses the segment and adds to the user count by linking to the segment by registering with the segment via an "add reference" method call as described later in connection with FIG. 8B2 or by having a cache create a page fragment object, which will be described in greater detail later in connection with FIG. 8B1.

A segment in the used state 252 can transition to the unused state 254 when the number of users falls to zero. In one embodiment, a software object can detach itself from a segment and decrement the associated user count by a "release" method call, which will be described in greater detail later in connection with FIG. 8C. The segment can return from the unused state 254 to the used state 252 when a user, which can be the same as a previous user or can be a new user, links to the segment. A segment in the unused state 254 can also be purged by a reaping algorithm or cache replacement algorithm and be returned to the released state 250. One embodiment of the invention retains segments of data that are relatively frequently accessed, e.g., segments of data containing selected sample table atom, in the used state 252 for a relatively long time. This advantageously increases the likelihood that such frequently accessed data remains in the cache, thereby increasing the hit ratio of the cache and enhancing efficiency.

A segment in the released state 250 can transition to the used state 252 when it is loaded with new data. It will be understood that the segment can first transition from the released state 250 to the unused state 254, and then transition from the unused state 254 to the used state 252 when the segment or page is being loaded as will be described later in connection with FIG. 8B1.

A segment can also transition from the used state 252 to the faulted state 256 when the segment of data is actually read by server software. The segment does not transition to the faulted state 256 if the segment is only read by an operating system. In one embodiment, the faulted state 256 is not separately tracked and is considered the same as the used state 252.

Cache Architecture

FIG. 3A illustrates an architecture for a shared multifile segment (SMS) cache according to an embodiment of the invention. The server software 102 can include one or more file readers for streaming of data to one or more clients. FIG. 3A illustrates representations of referencing data for file readers of the server software 102. Advantageously, the illustrated cache architecture uses virtual address spaces to manage segments of selected sample table atom data in a shared multi-file segment (SMS) cache 302. As will be explained in greater detail later, in one embodiment, each sample table child atom that is accessed by a file reader is provided with its own dedicated virtual address space. A separate virtual address space manager component for a file reader of the server software 102 maintains each virtual address space for the corresponding sample table child atom. A pointer is associated with the virtual address space. A pointer can be encapsulated by a software object, termed herein as a page fragment object. The page fragment object provides access to pages or segments of data stored in the SMS cache 302. The page fragment object can be configured to retrieve a portion of the segment that is stored in the SMS cache 302. In one embodiment, a page fragment object is used to access a segment of sample table atom data from within the SMS cache 302. A pointer to data should completely describe the location and size of data. An example of a data structure for managing the SMS cache 302 and an example of a data structure for the pointer will be described in greater detail later in connection with FIG. 4. It will be understood that an address range and an offset combined with size of data are interchangeable representations. In one embodiment, the pointer to a page or segment of data in the SMS cache 302 includes the following information for the data: (i) a physical address for the currently paged-in (cached) segment in the SMS cache 302, (ii) a size of the currently paged-in (cached) segment in the SMS cache 302, and (iii) a file descriptor which can identify the file from which the data is copied such that when the data is not available in a segment in the SMS cache 302, the data can be located in the mass storage by the SMS cache 302.

It will be apparent to one of ordinary skill in the art that the cache architecture disclosed herein can also be applied to additional atoms of a file format or to different atoms than the sample table atoms. To efficiently use the cached architecture, the virtual address space should be used to manage the portion of the data of a streamable file format or base format that is frequently accessed.

The sample table atoms are an example of data from the streamable file format of an MPEG-4 file that are typically relatively frequently accessed. The sample table atoms store information that maps a media time to a memory address space. The server system 100 frequently accesses the sample table atoms to locate the applicable data for either the hint data or the packets of data for the corresponding MPEG-4 presentation.

FIG. 3A illustrates a cache architecture where the server system 100 is shown streaming the same MPEG-4 media presentation to two clients or users. In one embodiment, a separate file reader for each media presentation is formed to arrange data for each separate stream of data to a client. It will be understood that the server system 100 can provide relatively many MPEG-4 data streams to relatively many clients. These MPEG-4 data streams can be the same media presentation or different media presentations. Often, a particular media presentation, such as a breaking news story, can be popular and selected for streaming by relatively many clients. It will be understood by one of ordinary skill in the art that the illustrated principles of caching data for the same media presentation to two clients can be generalized to caching a file that is dynamically formed into packets and sent to a number of clients. Advantageously, the illustrated cache architecture provides improved sharing of data for multiple clients. In addition, even when different clients select different media presentations, the illustrated cache architecture can still provide reduced thrashing, i.e., reduced repeated paging of data to the cache. This permits a server system that uses the illustrated cache architecture to advantageously provide service to relatively many clients.

Data can be stored in the SMS cache 302 in "pages" or "segments" of data. In one embodiment, each virtual address space corresponds to a contiguous segment of memory maintained for each sample table atom that is accessed by a file reader. The illustrated cache architecture can be configured to transfer data in fixed amounts of data or in variable amounts of data. In one embodiment, the amount of data in a page or segment is configurable. As used herein, the term "segment" and the term "page" relate to an amount of data, whether the amount of data is fixed or variable.

A first file reader 304 corresponds to a file reader for a media presentation for a first client. A second file reader 306 corresponds to a file format for the same media presentation for a second client. Although the media presentation requested may be the same for two or more clients, the streams of data for the clients may have started at different times so that the portions of data that are accessed by the server system 100 can vary. An example of an initialization sequence for a file reader is described in greater detail later in connection with FIG. 7. In FIG. 3A, the file readers are shown in a state where the media tracks and the hint tracks for a media presentation have been selected, and virtual address space managers for selected child atoms of sample table atoms have been formed to retain segments of data in the SMS cache 302 corresponding to selected sample table atoms for a relatively long time.

The first file reader 304 is illustrated accessing data for a first track 308, a second track 310, a first hint track 312, and a second hint track 314. It will be understood that the data is stored and retrieved from the SMS cache 302 and that the first track 308, the second track 310, etc., relate to representations of referencing the data. The first track 308 and the second track 310 can correspond to a variety of track types, such as to media tracks. For example, the first track 308 and the second track 310 can correspond to visual tracks, to audio tracks, and the like. In one arrangement, the first track 308 corresponds to a visual track, and the second track 310 corresponds to an audio track.

As described earlier in connection with FIG. 2A, media tracks in the MPEG-4 file format have sample table atoms. A first dashed box 316 indicates a collection of virtual address space managers corresponding to virtual address spaces for selected child atoms of the sample table atom of the first track 308. In one embodiment, a virtual address space manager is created for each of the following child atoms of a sample table atom: the key-frames atom (stss), the composition time atom (ctts), the decode time atom (stts), the chunk map atom (stsc), the size map atom (stsz), and the chunk offset atom (stco). The illustrated combination advantageously improves the hit rate of the SMS cache 302 while advantageously occupying a relatively small space in the SMS cache 302. Other combinations of child atoms that can be managed by virtual address space managers will be readily determined by one of ordinary skill in the art. Data for other child atoms of sample table atoms, i.e., those child atoms not selected to be managed in virtual address spaces, can be accessed via "short-life" links in a manner described later for accessing media data or for accessing hint tracks.

For example, a first child atom 356 can correspond to the key-frames atom (stss) for the first track 308 and can indicate an amount or range of data desired. A first virtual address space manager 369 maintains a virtual address space for the body of the first child atom 356. The first virtual address space manager 369 can force the SMS cache 302 to retain a relatively large segment of data corresponding to the first child atom 356, thereby advantageously reducing the amount of paging of data to the SMS cache 302. The size of the virtual address space depends on the size of the corresponding child atom data.

In one embodiment, the virtual address space manager manages a virtual address space that is the same size as the body of the child atom. The size of a child atom of a sample table atom of an MPEG-4 file format is stored in the file, and can be retrieved to set the size of the virtual address space. In one embodiment, the virtual address space manager further requests a page size of a fixed 64 kilobytes (kB), which can be much larger than the address range requested by the file reader. Other sizes will be readily determined by one of ordinary skill in the art. Further details of the operation of a virtual address space manager are described later in connection with FIGS. 3B, 9, and 10.

It should be noted that the actual data is stored in the SMS cache 302. Each selected child atom of the sample table atom of a track that is read by the first file reader 304 corresponds to a separate virtual address space. In one embodiment, the following information is maintained by a virtual address space manager for each virtual address space for a sample table atom: (i) a starting address of the virtual address space, (ii) the size of the corresponding address space, (iii), the physical address of the corresponding page or segment of data in the SMS cache 302, (iv) a mapping that translates the physical address of the page or segment in the SMS cache 302 to the virtual address, and (v) a file descriptor which can identify the file from which the data is copied such that when the data is not available in a segment in the SMS cache 302, the data can be located in the mass storage.

In one embodiment, the SMS cache 302 uses a page fragment object to provide access to data stored in a segment of the cache. The page fragment object corresponding to the page of data provides the pointer to the requested data in response to the invocation of a buffer query method of the page fragment object. A page fragment object can have one or more users (software component users). Relatively many users within the server can access a given segment. Examples of users within a server include virtual address space managers, file readers, server core, and server network services. Use and operation of a page fragment object will be described in greater detail later in connection with FIGS. 8A, 8B1, 8B2, and 8C.

Returning to FIG. 3A, the representation for the first track 308 also includes a corresponding first track media data atom 318 from the media data atom. In the illustrated embodiment, the first track media data atom 318 is not managed in virtual memory by a virtual address space manager. The second track 310 includes a second collection of sample table atoms 320 and a second track media data atom 322. The second collection of sample table atoms 320 is shaded in FIG. 3A. For clarity, the second collection of sample table atoms 320 is not shown in expanded form in FIG. 3A.

The first hint track 312 and the second hint track 314 include sample table atoms 324, 328 and hint track data 326, 330. In MPEG-4, the hint tracks have the same structure as the media tracks and can be accessed in the same manner as the actual track data, i.e., sample table atoms and virtual address space managers can be used. One difference is that hint track data is typically read by the server (and thus faulted) to identify needed media samples. The media samples or portions of media samples are then obtained using media track sample table atoms. The media data, unlike hint data, need not be read by the server and is thus typically not faulted.

The second file reader 306 corresponds to a logical representation of the same media presentation used for the first file reader 304, but started at a different time for the second client. Although the data retrieved to form packets for the second client can be the same as the data retrieved for the first client, the data retrieved for the second client can be retrieved at a different time. In one embodiment, a separate file reader is used for each separate stream of data, and a separate virtual address space manager is used for each selected type of data, e.g., selected child atoms of sample table atoms. The second file reader 306 includes a third track 332, a fourth track 334, a third hint track 336, and a fourth hint track 338.

The third track 332 and the fourth track 334 of the second file reader 306 correspond to the same tracks as the first track 308 and to the second track 310 of the first file reader 304. However, since the first client and the second client may not have started receiving the media presentation at the same time, the portions of the third track 332 and of the fourth track 334 accessed by the server system 100 may not be the same at a given time as the portions of the first track 308 and of the second track 310 that are accessed. It will also be understood that the third track 332 and the fourth track 334 can correspond to completely different tracks of a different media presentation, but that in the example shown in FIG. 3A, the first file reader 304 and the second file reader 306 correspond to the same media presentation.

A second dashed box 340 indicates a collection of virtual address space managers for selected child atoms of the sample table atom for the third track 332. Separate virtual address spaces for the virtual address space managers for the third track are allocated than the virtual address spaces used for the first track 308. For clarity, child atoms of the sample table atom for the third track 332 that are not managed by virtual address space managers are not shown in FIG. 3A. This permits the cache architecture to support media presentations that are started at different times and to support media presentations that are not the same.

The third track 332 also includes a third track media data atom 342. In the illustrated embodiment of the cache architecture, the third track media data atom 342 is not mapped to virtual addresses by corresponding virtual address space managers. The fourth track 334 includes a fourth collection of sample table atoms 344 and a fourth track media data atom 346. The fourth collection of sample table atoms 344 is shaded in FIG. 3A, but is not shown expanded in FIG. 3A for clarity.

The third hint track 336 and the fourth hint track 338 include sample table atoms 348, 352 and hint track data 350, 354. As described earlier in connection with the first hint track 312 and the second hint track 314, the hint tracks can be accessed using sample table atoms and virtual address space managers.

Virtual Memory Spaces

Virtual memory can be used to enlarge an address space. In one embodiment, a separate address space for each virtual address space manager can be maintained over the bodies of the selected child atoms of the applicable sample table atoms for each stream of data. The file reader uses the virtual addresses provided by the virtual address space manager to access data for the selected child atoms. In addition to other functions, the virtual address space manager maps the virtual addresses to actual addresses used by the SMS cache 302. Further details of the use and operation of a virtual address space manager are described later in connection with FIGS. 3B, 8, and 9. For relatively large files, only a relatively small fraction of the data will typically be accessed for a stream of data at a given time. This relatively small fraction of data can advantageously be copied from mass storage to the SMS cache 302, where the data is stored for retrieval by the file reader, e.g., for sample table atom data and hint track data, or is stored for retrieval by the operating system, e.g., for media data.

The sample table atoms for a media presentation are typically relatively frequently accessed. The metadata stored in these sample table atoms relates to a mapping of media time to an address space for media data, which is maintained in one or more media data atoms (mdat). The server system 100 can use the information stored in the sample data atoms to locate the relevant portions of the media data. Advantageously, the links from the relatively large virtual address space of a virtual address space manager to a segment in the cache are independently maintained in the virtual address space and are not shared, i.e., there is a virtual address space set aside for each selected child atom of the sample table atom bodies for each separate stream of data. The actual data for a sample table atom is stored in the SMS cache 302 and can advantageously be shared. Advantageously, the links from the relatively large virtual address spaces permit the corresponding segments in the SMS cache 302 to persist, thereby efficiently increases the hit ratio for relatively frequently access data such as child atoms of sample table atoms.

The first dashed box 316 includes a collection of virtual address space managers for multiple child atoms. As described earlier, a sample table atom can have many different types of child atoms. In the illustrated cache architecture of FIG. 3A, the first dashed box 316 is shown with virtual address space managers for the first child atom 356, a second child atom 358, and a third child atom 360. It will be understood that the number of child atoms of a sample table can vary among tracks, file formats, formatting standards, etc. In one embodiment, the virtual address space managers store information for generating pointers from the corresponding child atom of the sample table to a portion of the SMS cache 302. The second dashed box 340 is shown with a collection of virtual address space managers for a fourth child atom 362, a fifth child atom 364, and a sixth child atom 366. For clarity, the other child atoms and child atoms of the second collection of sample table atoms 320 and the fourth collection of sample table atoms 344 are not shown in FIG. 3A.

Long-Term Links

FIG. 3B conceptually illustrates further details of long-term links as used for selected child atoms of sample table atom data. A child atom of a sample table atom can include a relatively large number of samples, i.e., data for a particular unit of time, such as data for a frame. However, when the server system 100 is providing a stream of a media presentation to a client, the server system 100 can access the samples of a child atom in relatively small quantities. For example, the server software 102 can read the samples of the child atoms of sample table atom data to locate data or to attribute a time stamp to the data.

For each selected child atom, a virtual address space manager creates a virtual address space in virtual memory for the child atom. In turn, a virtual address space manager can use a corresponding page or segment of data from the SMS cache 302. The SMS cache 302 should cache data in a segment of at least the requested size. In one embodiment, the virtual address space manager registers with the segment by calling an "add reference" method, which is described in greater detail later in connection with FIG. 8B2. This generates a first long-term link 380. Advantageously, the first long-term link 380 is not terminated when a relatively small amount of data for the child atom is retrieved.

Rather, the virtual address space manager requests the relatively large page or segment size, and maps or translates requested data for the child atom from the virtual address space to the actual address space of a portion 397 within a first segment 383 as shown in FIG. 3B. This translation is represented by a curve 357. Advantageously, the virtual address space manager does not relinquish the first segment 383 upon retrieving a relatively small amount of data, but rather, keeps accessing the same first segment 383 until the data requested for the child atom is no longer in the first segment 383. This provides the "long-term" link for the selected child atoms of sample table atoms.

In one embodiment, the virtual address space managers for the child atoms store a reference to one page or segment of data in the SMS cache 302 for each child atom that is selected to be managed by a virtual address space manager. This segment of data can be of fixed size, configurable size, or variable size. In one embodiment, the virtual address space manager reserves a segment in the SMS cache 302 that is at least 64 kB in size. It will be understood that the SMS cache 302 may have an internally controlled minimum segment size and can independently select a segment size that is larger than requested. When the data requested for a child atom stays within the corresponding page or segment of the SMS cache 302, the virtual address space manager does not call the "release" method, and thus does not relinquish use of the corresponding segment in the SMS cache 302. In so doing, data for a child atom of a sample table atom can advantageously be maintained in the SMS cache 302 with a relatively long-term link.

These long-term links are also used for other selected child atoms. For example, returning to FIG. 3A, segments of data that hold references to samples of child atoms, e.g., pointers or links to samples of child atoms, are represented by the first virtual space 368, a second virtual space 370, and a third virtual space 372, which correspond to virtual spaces for the first child atom 356, the second child atom 358, and the third child atom 360, respectively. These virtual address spaces are maintained within the virtual address space of the respective virtual address space manager.

Similarly, a fourth virtual space 374, a fifth virtual space 376, and a sixth virtual space 378 correspond to references to segments of data for the fourth child atom 362, the fifth child atom 364, and the sixth child atom 366. It will be understood that a segment of data in the SMS cache for a child atom can hold data for one or more samples of the child atom. Further details of a process for maintaining long-term links are described in greater detail later in connection with FIGS. 9 and 10.

The virtual address space managers permit the server system 100 to locate the data for a child atom in a corresponding segment of the SMS cache 302 and establishes a "long-term" link to the cached segment in the SMS cache. The long-term link advantageously maintains sample table atom data in the SMS cache 302 longer than hint track data and media data. The long-term link can be used to advantageously inhibit the replacement of a segment in the SMS cache 302 that stores sample table atoms to improve the hit rates of the SMS cache 302 as will be described in greater detail later in connection with FIGS. 9 and 10.

An "active" segment of memory in the SMS cache 302 for a child atom of a sample table atom is indicated in FIG. 3A as a shaded box. It will be understood that as a media presentation is streamed to a client, and the corresponding data is retrieved, that new segments of sample table data will be loaded to the SMS cache 302. When the new segment of data is loaded to the SMS cache 302, the virtual address space manager, e.g., the first virtual address space manager 369, can correspondingly be updated. In one embodiment, the memory used by the virtual address space manager is updated in a "swap on miss" manner. It will be understood that two different clients can receive streams at different times such that an update to a virtual address space manager for one client does not necessarily imply an update to another client, e.g., an update for a virtual address space manager in the collection indicated by the first dashed box 316 can occur without an update to a corresponding virtual address space manager in the collection indicated by the second dashed box 340. A process of initializing the virtual address space manager will be described in greater detail later in connection with FIG. 9. A process of using the virtual address space manager will be described later in connection with FIG. 10. A data structure that can be used by a virtual address space manager will be described in greater detail later in connection with FIG. 4.

The SMS cache 302 can be fabricated from relatively fast memory, such as solid-state RAM. The memory in the SMS cache 302 corresponds to "real" memory and not to virtual memory. In one embodiment, the operating system 101 retrieves data from the SMS cache 302 via memory-mapped I/O. When the desired data is available from the SMS cache 302, the data can be retrieved relatively quickly. In one embodiment, the SMS cache 302 includes about 1 gigabyte (GB) of DRAM. It will be understood that the memory size of the SMS cache 302 can vary in a very broad range. The SMS cache 302 is divided into multiple segments of memory. A segment of memory corresponds to an amount of memory. In one embodiment, the size of a segment of memory in the SMS cache 302 can be configured. The segment size indicated by an "add reference" method call can be used by the SMS cache to indicate the minimum size of the corresponding segment. In one embodiment, the size of a segment of data in the SMS cache 302 is larger than a desired range of data, such as the size of a data segment. For example, where a data segment corresponds to 256 kB of data, it can be advantageous to use a segment size larger than 256 kB, such as a segment size of 256 kB+64 kB. This technique, while optional, can advantageously decrease the burden on a CPU when the segment in the SMS cache 302 is shared among two or more clients. The byte boundaries encountered when streaming data to a client may vary when sending data to a client, and the oversized segment technique permits data near a byte boundary to be advantageously retrieved from a single segment in the SMS cache 302, as compared to being retrieved from a portion of a first segment, retrieved from a portion of a second segment, and stitched together by the CPU.

The references from the sample tables to the SMS cache 302 preserve the cached data in the SMS cache 302 corresponding to sample table atoms for a relatively long time such that the cached data is readily available for future access by the server system 100. This has the effect of prioritizing the sample table data in the SMS cache 302 and prevents the repeated paging of data or "thrashing" from the mass storage to the SMS cache 302. The references or "long-term" links between the virtual address space managers for selected sample table atom data and the SMS cache 302 are represented by solid lines with rounded corners in FIG. 3A. For example, the first long-term link 380, a second long-term link 381, and a third long-term link 382 indicate that child atoms in the first virtual space 368, the second virtual space 370, and the third virtual space 372 respectively reference to the first segment 383, to a second segment 384, and to a third segment 385 of the SMS cache 302. For clarity, interaction of a virtual address space manager with a page table, such as the page table described in FIG. 4, is not shown.

A fourth long-term link 386, a fifth long-term link 387, and a sixth long-term link 388 indicate that child atoms corresponding to the fourth virtual space 374, the fifth virtual space 376, and the sixth virtual space 378 respectively reference to the first segment 383, to the second segment 384, and to a fourth segment 389 of the SMS cache. As illustrated in FIG. 3A, segments in the SMS cache 302 can be shared by more than one file reader, e.g., the first segment 383 is shared by the first file reader 304 and by the second file reader 306.

Short-Life Links

FIG. 3C conceptually illustrates further details of short-life links, which can be used for other data, such as for hint track data, for media data, and for child atoms of sample table atoms that are not selected for long-term links. These "short-life" links are represented by dashed lines with squared-off corners in FIGS. 3A and 3C. In one embodiment, the short-life links are implemented by adding and removing references to page fragment objects. For example, a first short-life link 390 references the first track media data atom 318 to a fifth segment 391 of the SMS cache 302. The first short-life link 390 can be established by adding a reference to a page fragment object for the fifth segment 391. In one embodiment, when the desired data is extracted by the server software or by the operating system, the reference the fifth segment 391 is immediately released. This can permit the segments corresponding to the short-life links to be purged relatively quickly. It should be noted that there can be more than one page fragment objects that reference a segment, such that the destruction or release of an individual reference to the segment does not necessarily imply that the associated user count for the segment will be zero.

Returning now to FIG. 3A, a second short-life link 392 references the second hint track second child atom 330 to a sixth segment 393 of the SMS cache 302. A third short-life link 394 references the third track media data atom 342 to a seventh segment 395 of the SMS cache. A fourth short-life link 396 references the fourth hint track second child atom 354 to the sixth segment 393, which was also referenced by the second short-life link 392. It will be understood that as the media presentation is sent to the client by the server system 100, the segments from which the server system 100 retrieves data can also change. One embodiment of a process for releasing unused segments will be described in greater detail later in connection with FIG. 11.

Accessing a Page in the SMS Cache

Figure 3D:
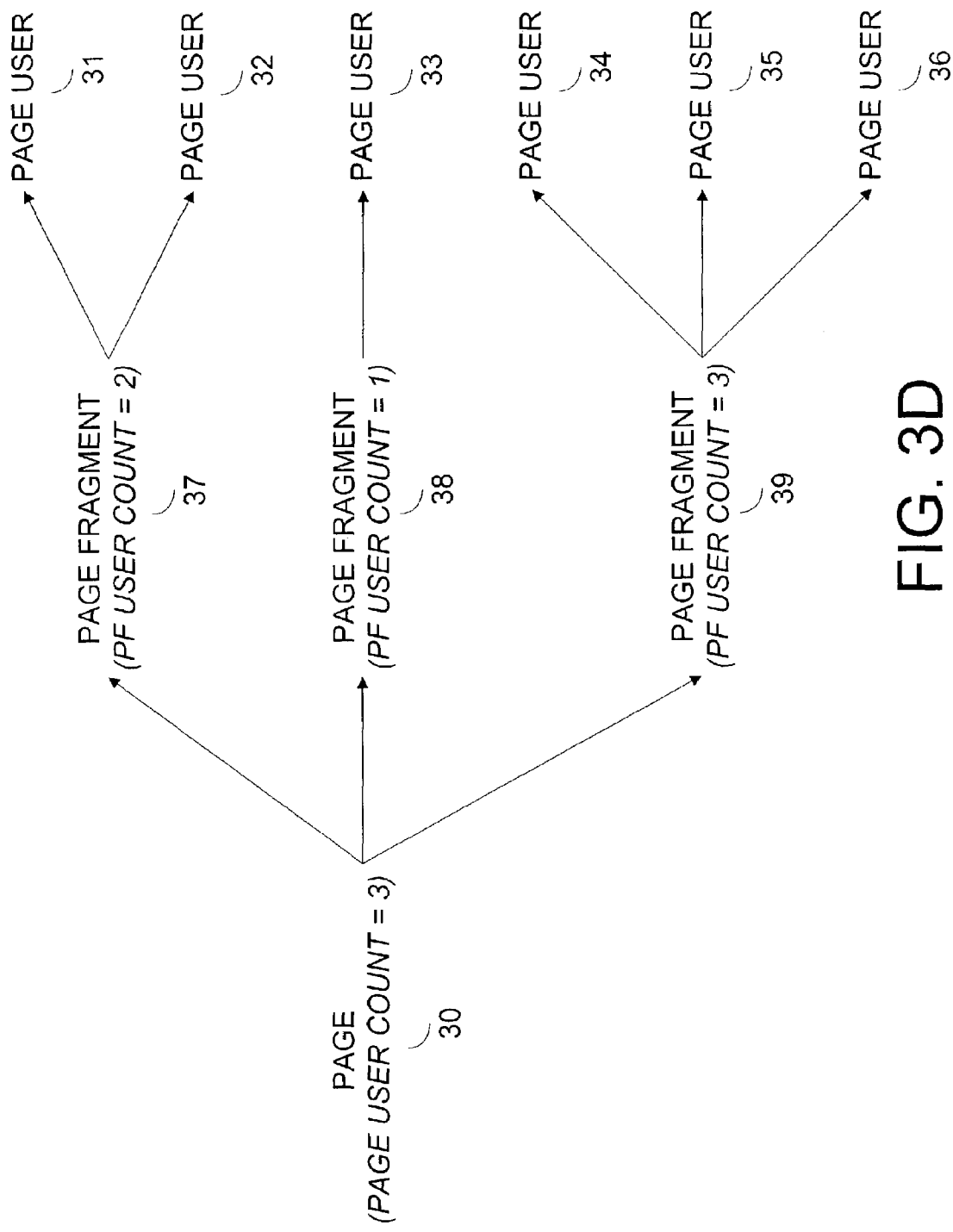
FIG. 3D illustrates accessing a page or segment in the SMS cache of FIG. 3A with page fragment objects.

FIG. 3D illustrates an example of accessing a page or a segment in the SMS cache 302. The data that is stored in a page or segment in the SMS cache 302 can be shared among one or more users or software components. In one embodiment, these users access the data via page fragment objects.

Figure 6:
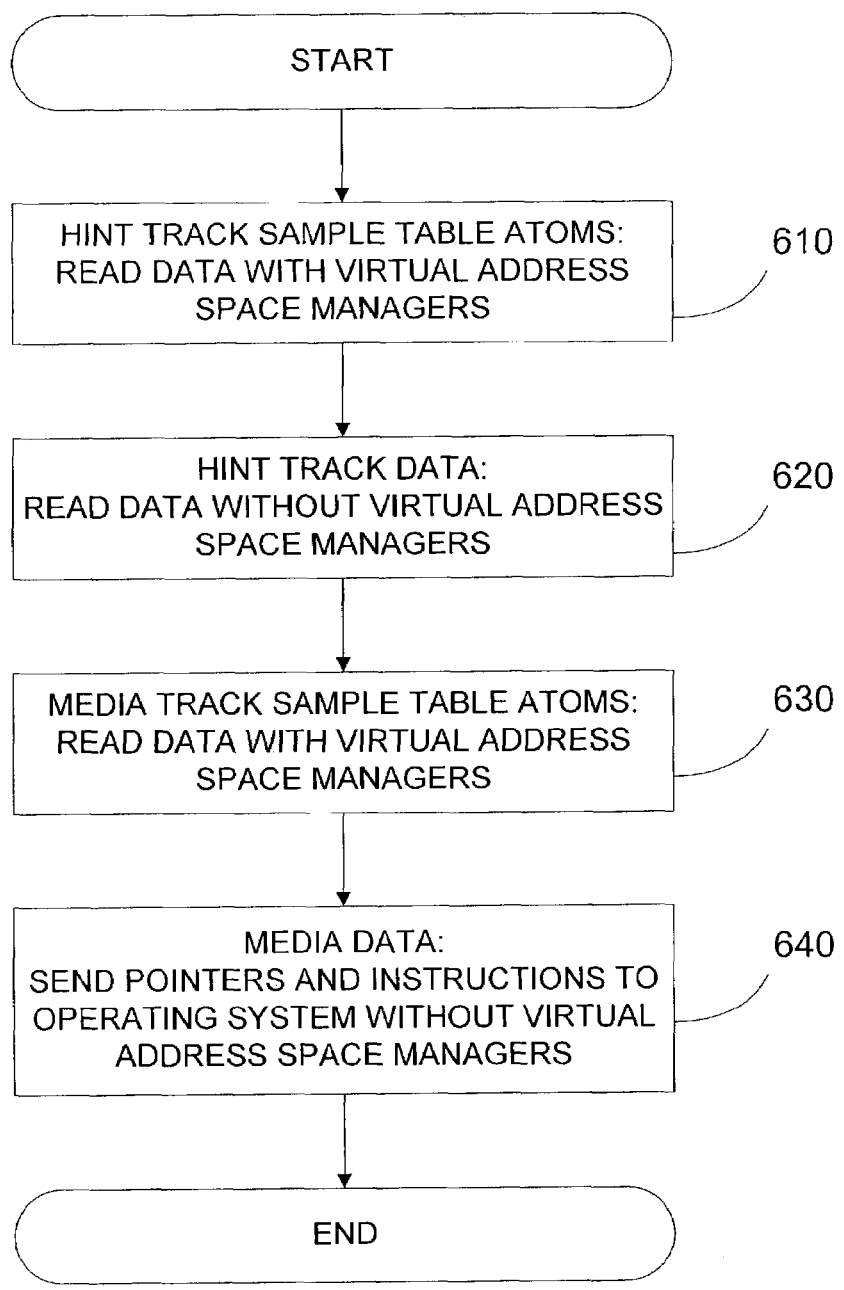
FIG. 6 is a flowchart that generally illustrates an overview process performed by a file reader.

In FIG. 3D, 6 users share a page 30 of data. In the example shown, the 6 page users access the page 30 via 3 page fragment objects. Separate user counts are maintained for each page and for each page fragment. A page fragment, object provides access to a page fragment. A page can be conceptually divided into one or more page fragments. These fragments can vary in size, can overlap with one another, etc. A page fragment object is created when data is requested from the SMS cache. In addition, ownership of a page fragment object can be shared and can be transferred among various software objects in the server software 102. Transfer of "ownership" of a page fragment object is described in further detail later in connection with FIG. 8C.

The 6 page users in the example shown in FIG. 3D correspond to a first page user 31, a second page user 32, a third page user 33, a fourth page user 34, a fifth page user 35, and a sixth page user 36. The page users can correspond to a variety of software components. For example, the first page user 31, the second page user 32, the third page user 33, the fourth page user 34, the fifth page user 35, and the sixth page user 36 can correspond to an address space manager, a file reader, another address space manager, another file reader, a server core, and server network services, respectively. It will be understood that the users or software components that access a given page can change over time.

The page fragment objects correspond to a first page fragment object 37, a second page fragment object 38, and a third page fragment object 39. In one embodiment, data from a page or segment in the SMS cache 302 can only be accessed via a page fragment object. In the illustrated example, the first page user 31 and the second page user 32 share the first page fragment object 37 to access the page 30 such that a page fragment (PF) user count for the first page fragment object 37 is 2. The third page user 33 accesses the page 30 via the second page fragment object such that a PF user count for the second page fragment object 38 is 1. The fourth page user 34, the fifth page user 35, and the sixth page user 36 access the page 30 via the third page fragment object 39 such that the PF user count for the third page fragment object 39 is 3.

A separate count is maintained for the users of the page 30, i.e., a count of the page fragment objects that access the page 30. In the example of FIG. 3, there are 3 page fragment objects using the page 30, so that the page user count for the page 30 is 3.

When a page user, e.g., the first page user 31, has determined that it has finished accessing the desired page fragment, the page user releases the page fragment object, which decrements the PF user count associated with the released page fragment. In one embodiment, a virtual address space manager does not release the page fragment object until the corresponding page does not contain the desired data, and other page users release the page fragment object when the desired data is retrieved.

In one embodiment, a page fragment object with no users is destroyed. The destruction of a page fragment objects results in a decrementing of the user count associated with the page, such as the user count for the page 30. When the user count associated with a page is zero, the page is in the unused state 254 as described earlier in connection with FIG. 2B and can be released. Conversely, the creation of a page fragment object increments the page user count associated with a page, which can also result in a page transitioning from the unused state 254 to the used state 252 or remaining in the used state 252. Further details of the operation and use of page fragment objects are described later in connection with FIGS. 8A–8C.

Sample Data Structures

FIG. 4 illustrates a sample format for a data structure 400 that can be used to manage the SMS cache 302. The data structure can be incorporated in a page table for the SMS cache 302. The illustrated format has been simplified for clarity. An SMS cache address field 402 can correspond to a real address in the SMS cache 302 for a segment. In one embodiment, the contents of the SMS cache address field 402 can correspond to a base address. It will be understood by the skilled practitioner that flat data structures, such as tables, or relational data structures can be used. The illustrated format uses a flat data structure.

A file descriptor field 404 can store an identifier for a file, such as the name of the file, from which the segment of data in the SMS cache 302 was copied. A starting address field 406 and a size field 408 can indicate the portions of the file that are stored in the corresponding segment in the cache. A number of users field 410 can track whether a particular segment is used or is unused by a software object or component. In one embodiment, a segment is unused when the number of users is zero and is used when the number of users is other than zero. In one embodiment, a segment of data in the cache is accessed through one or more page fragment objects, and the count stored in the number of users field 410 relates to the number of existing page fragment objects that correspond to the segment, e.g., the page user count described earlier in connection with FIG. 3D. Separate page fragment objects can correspond to different ranges of data with a corresponding segment.

A released field 412 can be used to store a flag that indicates whether the segment is in the released state 250 described earlier in connection with FIG. 2B. It will be understood that the table can include other fields, such as a last access time, a total number of accesses, etc., to support selected cache replacement policies.

FIG. 4 also illustrates an example of a data structure 420 for a virtual address space manager. A starting virtual address field 422 stores a starting address for the virtual memory space allocated to the virtual address space manager. A virtual space size field 424 stores the size of the virtual memory space. An SMS cache address field 426 stores the real or actual address of the page or segment in the SMS cache 302 that stores the corresponding data. A file descriptor field 428 identifies the file for the data. The contents of the file descriptor field 428 can be used to retrieve the data from the mass storage when the data is not already present in the SMS cache 302. A mapping field 430 can contain an index, such as an offset address, that is used to map the virtual addresses used by the virtual address space manager to the actual address of the data in the SMS cache 302. A size field 432 stores an indication of the size of the corresponding page fragment from the SMS cache 302. A page fragment link field 434 maintains a link to a corresponding page fragment object that is used to access the data from a segment in the SMS cache 302, thereby maintaining the long-term link.

FIG. 4 further illustrates an example of a data structure 440 for a page fragment. An SMS cache address field 442 stores a physical address for the desired and currently paged-in (cached) segment in the SMS cache 302. A size field 444 stores a size of the corresponding segment in the SMS cache 302. A number of users field 446 stores a user count associated with the page fragment, such as the PF user counts described earlier in connection with FIG. 3D.

A Tiered Caching System

Figure 5:
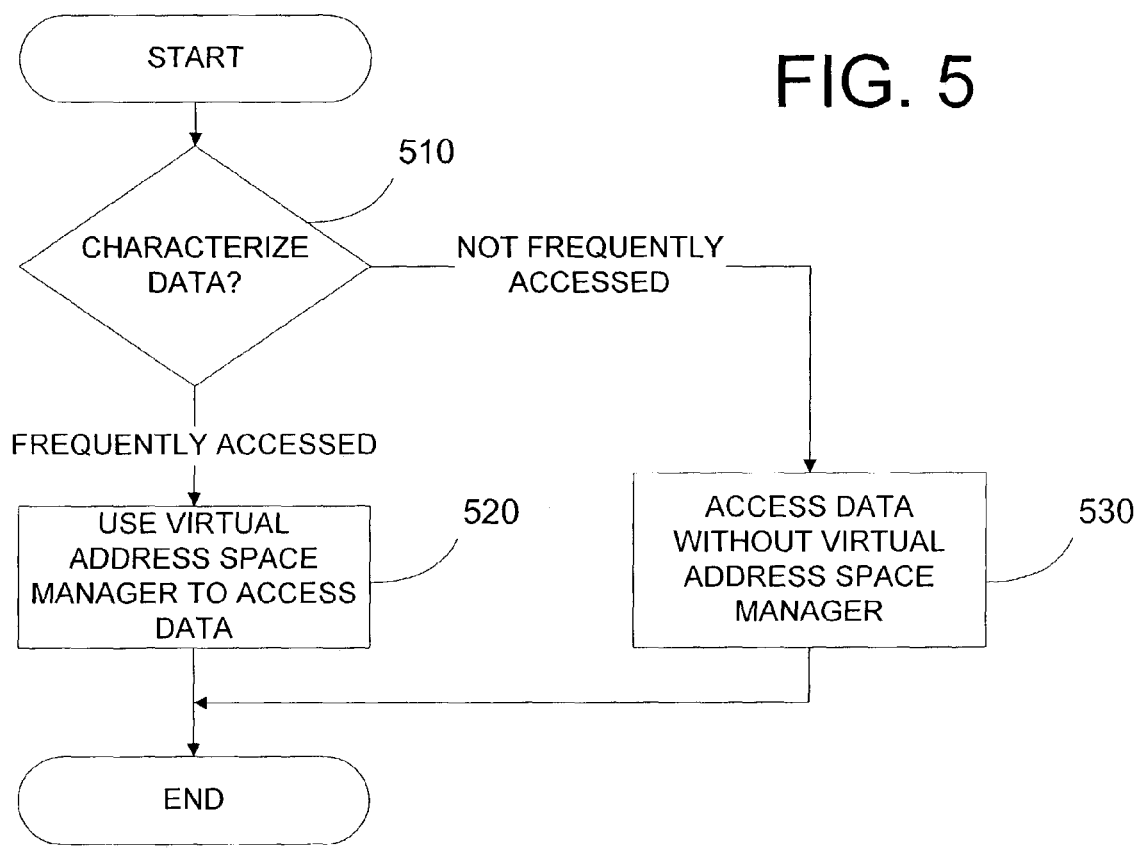
FIG. 5 is a flowchart that illustrates a tiered caching process.

FIG. 5 is a flowchart that generally illustrates a process for a tiered caching system. The process starts at a decision block 510. In the decision block 510, the process characterizes the type of cached data to determine whether the particular data that is cached is data that is relatively frequently accessed or not. For example, in one embodiment, the process can characterize metadata as relatively frequently accessed and can characterize other data, such as media data, to be less frequently accessed. In another example, data corresponding to sample table atom data can be characterized as frequently accessed and other data can be characterized as less frequently accessed. When the data is characterized as frequently accessed, the process proceeds from the decision block 510 to a state 520. In the state 520, the data that is deemed to be relatively frequently accessed is accessed via virtual address space managers. The virtual address space managers link to their respective segments for a relatively long time, thereby increasing the time that the segment is in the used state 252 and thereby inhibiting the release of the segment. This advantageously prevents the inefficient re-paging of data.

Returning to the decision block 510, when the data is characterized as not relatively frequently accessed, the process proceeds from the decision block 510 to a state 530. In the state 530, the process accesses the data that has been characterized as not as frequently accessed without using the virtual address space managers.

Overview Process Performed by a File Reader

FIG. 6 is a flowchart that generally illustrates an overview process performed by a file reader to access data for itself and to provide access to data for other software components, such as an operating system. The process starts at a state 610. In the state 610, the file reader retrieves data from the SMS cache 302 relating to hint track sample table atoms using the virtual address space managers described earlier in connection with FIGS. 3A and 3B. The server software 102 reads the data to determine the location of other data, such as the location of samples of hint tracks. The process advances from the state 610 to a state 620.

In the state 620, the file reader retrieves data for hint tracks. The hint track data is read by the server software 102 to extract instructions on how to form packets of data for the selected network protocol. The process advances from the state 620 to a state 630.

In the state 630, the server software 102 retrieves data from the SMS cache 302 relating to media track sample table atoms using virtual address space managers. The server software 102 reads the data to determine the location of desired samples of media data. The process advances from the state 630 to the state 640.

In the state 640, the server software 102 sends pointers that indicate where media data can be located and sends instructions extracted from the hint tracks to the operating system 101. The pointers can include, for example, a link to the page fragment containing the data, an offset address into the page fragment and a size of data. The operating system 101 retrieves the data from the cache 106 and forms the packets according to the instructions, and forwards the packets to the network interface 103 for transmission to clients. In the illustrated embodiment, the retrieving of media data that is formed into packets is efficiently performed by the operating system 101 such that the media data does not have to pass through the user space that is occupied by the server software 102. The process can continue in an ongoing manner.

Initializing a File Reader

Figure 7:
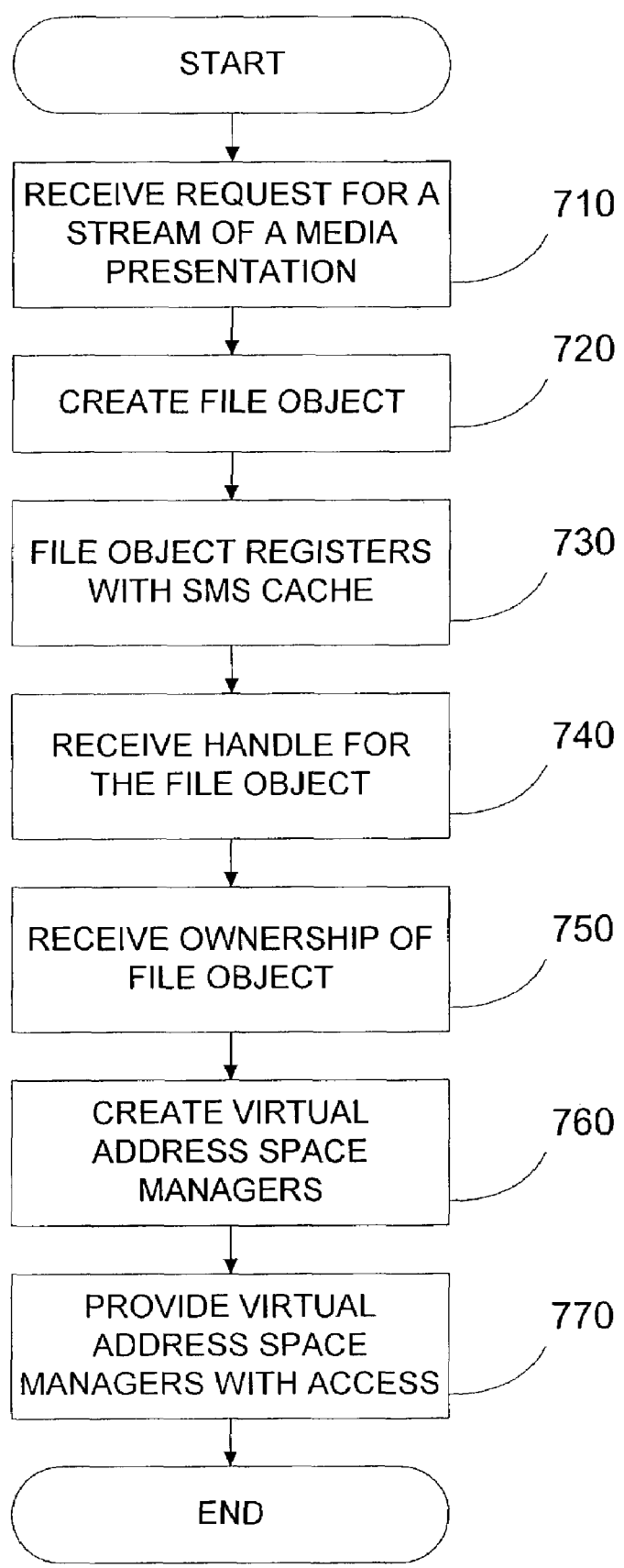
FIG. 7 is a flowchart that generally illustrates a process for initializing a file reader.

FIG. 7 is a flowchart that generally illustrates a process for initializing a file reader. It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like. The process starts at a state 710, where the process receives a request for a stream of data, such as a stream of a media presentation, from a client. The request can be acknowledged and service can be provided to the client. However, it will be understood by one of ordinary skill in the art that service can also be denied when, for example, the number of users that are already being serviced is relatively high. One embodiment advantageously denies additional service when the SMS cache 302 is virtually full as will be described in greater detail later in connection with FIG. 11. When service is provided, the process advances from the state 710 to a state 720.

In the state 720 the operating system 101 creates a file object corresponding to the file that holds the data requested by the client. The file object is a software abstraction that represents the file and can be used to obtain access to data in the file. The process advances from the state 720 to a state 730.

In the state 730, the file object registers with the SMS cache 302 to request access to the corresponding file. In response, the SMS cache 302 locates the file within the cache or, if the file is not presently cached, the SMS cache 302 creates a new entry for it. The process advances from the state 730 to a state 740.

In the state 740, the file reader receives a handle, i.e., a unique identifier, for the file object from the SMS cache 302. The process advances from the state 740 to a state 750.

In the state 750, the file reader takes ownership of the file object that corresponds to the desired file. In one embodiment, the transfer of ownership is implemented by providing a pointer to the file reader, which then becomes responsible for the pointer's destruction when no longer used. The process advances from the state 750 to a state 760.

In the state 760, the process creates virtual address space managers. In the illustrated embodiment of FIG. 3A, the process creates virtual address space managers only for selected child atoms of sample table atoms. In one embodiment, the size of the virtual address space used by a virtual address space manager is the same size as the body of the child atom. The size of the body of the child atom can be read from the file. The process advances from the state 760 to a state 770.

In the state 770, the process provides the virtual address space managers with access to the file object so that the virtual address space managers can communicate with the SMS cache 302. This completes the initialization of a file reader.

Using a Page Fragment Object

Figure 8A:
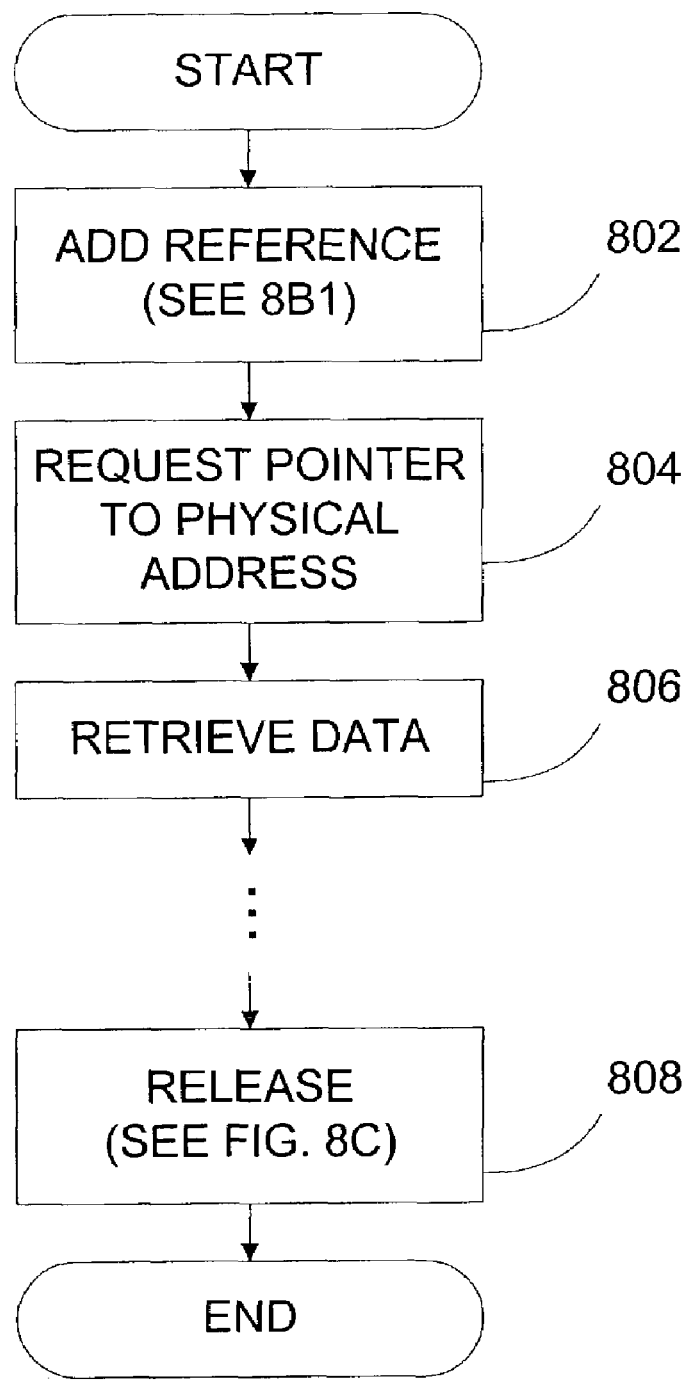
FIG. 8A is a flowchart that generally illustrates a process for using a page fragment object.

FIG. 8A is a flowchart that generally illustrates a process for using a page fragment object. It will be appreciated by the skilled practitioner that the illustrated process can be modified in a variety of ways. For example, in another embodiment, various portions of the illustrated process can be combined, can be rearranged in sequence, can be removed, and the like. In one embodiment, the page fragment object is created by the SMS cache 302 and is a mechanism by which the SMS cache 302 provides access to a segment of data in the cache. The creation of a page fragment object and accessing the SMS cache is described later in connection with FIG. 8B1. A page fragment object can be used directly for the retrieval of data related to, for example, media data and to hint tracks, and can also be used by a virtual address space manager for the retrieval of data related to selected child atoms of sample table atoms. In one embodiment, a page fragment object is the only way that the SMS cache 302 provides access to data in a segment of the cache. A given segment of the SMS cache 302 can be shared by one or more users or software components via a page fragment object.

To use a page fragment object, the process starts at a state 802. In one embodiment, the process calls an "add reference" method of the page fragment object requesting an increase in the user count of that particular page fragment object. Further details of the effect of calling the "add reference" method are described later in connection with FIG. 8B1. The process proceeds from the state 802 to a state 804.

In the state 804, the process requests from the page fragment object a pointer to the physical address where the page fragment data resides in the SMS cache 302. The process receives the physical address to the SMS cache address, the size of the page fragment, and the user count associated with the page fragment object. In one embodiment, the process obtains the physical address for the page fragment data by invoking a "get buffer" method of the page fragment object. In one embodiment, the process obtains the size of the page fragment by invoking a "get size" method of the page fragment object, which returns a number of bytes representing the size of the page fragment. The process advances from the state 804 to a state 806.

In the state 806, the process retrieves the data from the SMS cache 302. The data can be retrieved by a user, such as a file reader, the operating system 101, the server software 102, etc. The data can be retrieved by dereferencing the pointer to the page fragment data that was returned in the state 804. The retrieval of data is valid up to the returned size from the state 804. When a user has completed its access to the data, such as, for example, when the operating system has packetized the media data and sent the data to the network interface 103, the process advances from the state 806 to a state 808.

In the state 808, the process calls a "release" method of the page fragment object. The calling of the "release" method can, but does not necessarily result in a release of the corresponding segment as there may be other users of the segment in the cache. The calling of the "release" method unlinks the user (software component) from the segment in the cache. In one embodiment, short-lift links are released when the software object has received the data and long-term links are released when the software object can no longer find its desired data in the linked segment. Further details of the operation of the "release" method are described later in connection with FIG. 8C.

In conventional systems, i.e., systems without virtual address space managers, the process can disadvantageously release data relatively rapidly. This unlinking can result in the removal of the segment from the cache. While this may be appropriate for media data, the rapid release of the segment is disadvantageous with selected child atom data for sample table atoms, which can be relatively frequently accessed. The virtual address space managers prevent the rapid unlinking from segments in the cache, thereby advantageously providing selected child atom data with relatively long-term links to their respective segments in the cache, which thereby increases the likelihood that future data requested for selected child atoms will be in the cache.

Accessing the Cache

FIG. 8B1 describes accessing a page or segment in the SMS cache 302 with a page fragment object. It will be appreciated by the skilled practitioner that the illustrated process can be modified in a variety of ways. For example, in another embodiment, various portions of the illustrated process can be combined, can be rearranged, can be removed, and the like. The page fragment object provides the user (software component) of the page fragment object with data from the SMS cache 302. To begin to access the data, the user starts by requesting access to the page fragment object. It will be understood that the SMS cache 302 can consider the requested segment size to be a minimum size for a segment.

The process starts at a state 820. In the state 820, the process identifies the page from which data is sought. The page can be identified by sending pointer data. An example of pointer data includes a file descriptor, an address for the data, and the size of the page or segment that should be cached as described earlier in connection with FIG. 4. The process advances from the state 820 to a decision block 822.

In the decision block 822, the process determines whether a page or segment that contains the desired page fragment is loaded in the SMS cache 302. In one embodiment, the SMS cache 302 determines whether the page is loaded or not. The process proceeds from the decision block 822 to a state 824 when a suitable page or segment is already loaded. Otherwise, the process proceeds from the decision block 822 to a state 826 and subsequently to a state 828 to load the page.

In the state 826, the process loads the page to the cache. In one embodiment, the data for a new segment is not actually loaded from the mass storage to the segment until the data is actually read by a user, such as a file reader, the operating system 101, the server software 102. It will be understood that the time when data is actually loaded to a page or segment can vary with the operating system that is used. The process advances from the state 826 to the state 828.

In the state 828, the process sets the count of users for the page to 0, and clears the "released" flag. For example, the count of users can be stored in the number of users field 410, and the flag can be stored in released field 412 as described earlier in connection with FIG. 4. Setting the count of users for the page to 0 temporarily places the page in the unused state 254 described earlier in connection with FIG. 2B. In the illustrated process, the incrementing of the page user count to place the new page in the used state 252 is performed later in a state 832.

Returning to the state 824, at this point in the process, a page or segment in the cache containing the desired page segment is loaded in the SMS cache 302. The process creates a page fragment object to access the page or segment. In one embodiment, the page fragment object is a software object created by the SMS cache 302 to provide access to data. The process advances from the state 824 to a state 830.

In the state 830, the process sets the user count associated with the page fragment object to 1. It should be noted that the user count for the page fragment object is a different count than the user count associated with the page. Ownership of the page fragment object can be passed from one software user to another as described in further detail in connection with FIG. 8B2. The process advances from the state 830 to the state 832.

In the state 832, the process increments the user count associated with the page or segment in the SMS cache 302 that holds the desired page fragment. The incrementing of the user count can transition a new page from the unused state 254 to the used state 252 or can maintain a page that was already in the used state 252 in the used state 252. The process advances from the state 832 to a state 834.

In the state 834, the process transfers ownership of the fragment to the user. For example, the SMS cache 302 can transfer ownership of the page fragment object to the operating system, to a file reader, to a virtual address space manager, and the like. The process then ends, and it will be understood that the process described in FIG. 8B1 can be repeated as data is requested from the cache.

Transfer of Ownership for a Page Fragment Object

FIG. 8B2 is a flowchart that generally illustrates a transfer of ownership for a page fragment object. In FIG. 8B2, the page fragment object is transferred from a current owner to a new owner. For example, a page fragment object that is created by the SMS cache 302 can be transferred to a file reader. In another example, the server software 102 transfers ownership within software components within the server software 102.

The process starts at a state 840. In the state 840, the new owner of the page fragment object, such as a file reader, calls the "add reference" method. The "add reference" method call can correspond to, for example, a parameter that is provided to the page fragment object. The "add reference" method call increments a count of users for the page fragment object, i.e., increments the PF users count. The process advances from the state 840 to a state 842.

In the state 842, the current owner relinquishes ownership of the page fragment object by "releasing" the page fragment object. The count associated with the page fragment object is decremented by 1. It will be understood that the process can be repeated when a transfer of ownership of a page fragment object is desired.

"Releasing" a Page Fragment Object

Figure 8C:
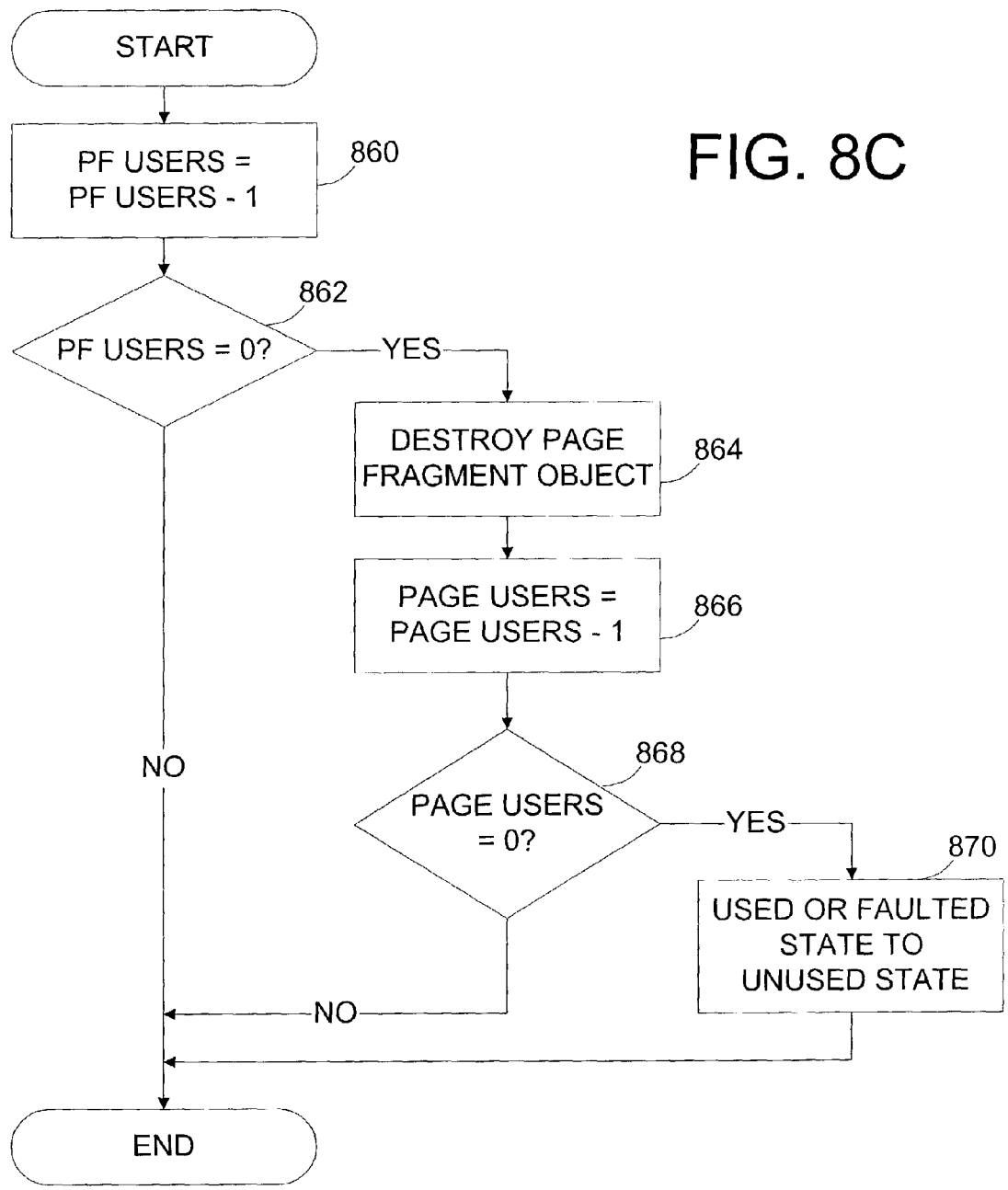
FIG. 8C is a flowchart that generally illustrates releasing a page fragment object.

FIG. 8C describes the operation of a "release" method call to a page fragment object. It will be appreciated by the skilled practitioner that the illustrated process can be modified in a variety of ways. For example, in another embodiment, various portions of the illustrated process can be combined, can be rearranged, can be removed, and the like. A user, such as the operating system 101, the server software 102, or a file reader calls the "release" method when the user has determined that it has completed accessing the corresponding data. The calling of the "release" method unlinks the user from the segment in the cache. The link that is unlinked can correspond to either a short-life link, as described earlier in connection with hint tracks and media data in FIG. 3C, or can correspond to long-term links as described in connection with selected child atoms of sample table atom data in FIG. 3B. In one embodiment, a virtual address space manager advantageously avoids unlinking from a segment and the possible premature release of the segment by postponing the call of the "release" method as described later in connection with FIG. 10.

The process starts at a state 860. In the state 860, the process decrements the user count associated with the page fragment object. It should be noted that this is a different user count than the user count associated with the segment. The process advances from the state 860 to a decision block 862.

In the decision block 862, the process determines whether the number of users of the page fragment object is zero. If the number of users is zero, the process proceeds to a state 864. Otherwise, the number of users is not zero, which indicates that the page fragment is still used by another user (software component), and the process accordingly ends.

In the state 864, there are no other users of the page fragment object, and the process destroys the page fragment object. This can be implemented by, for example, deleting a reference in a data structure. The process advances from the state 864 to a state 866.

In the state 866, the process decrements the page user count associated with the corresponding page or segment. There can be other page fragment objects linked to the segment of data other than the destroyed page fragment object so that whether the segment transitions from the used state 252 or from the faulted state 256 to the unused state 254 depends on whether there are other existing page fragment objects that are linked to the segment. The process advances from the state 866 to a decision block 868.

The decision block 868 determines whether there are any other users of the corresponding page or segment by inspecting a user count, such as a count stored in the number of users field 410. When the number of users is 0, there are no other users of the segment, and the process proceeds from the decision block 868 to a state 870. Otherwise, there are other users of the page or segment and the process ends.

In the state 870, the corresponding page or segment is transitioned from the used state 252 or the faulted state 256 to the unused state 254. Pages that are in the unused state 254 can be purged by a cache replacement algorithm as described later in connection with FIG. 11 or can even be re-activated into the used state 252.

Initializing a Virtual Address Space Manager

Figure 9:
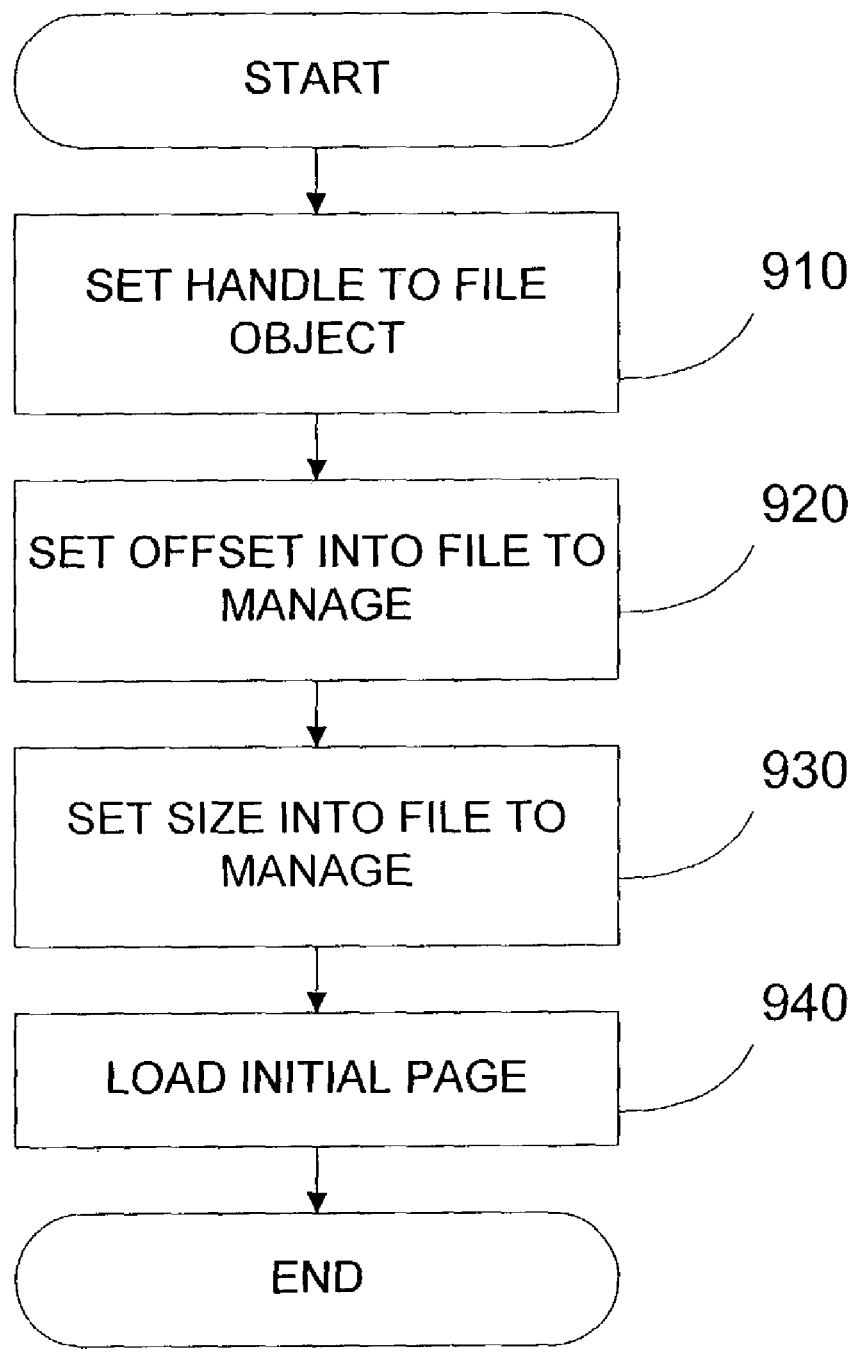
FIG. 9 is a flowchart that generally illustrates a process performed by a virtual address space manager during initialization.

FIG. 9 is a flowchart that generally illustrates a process for initializing a virtual address space manager. In one embodiment, a separate virtual address space manager is used for each selected child atom. The process starts at a state 910, where the virtual address space manager sets its handle, i.e., a unique identifier, to the file object. The file object represents the file and is the user of the SMS cache 302. The process advances from the state 910 to a state 920.

In the state 920, the process sets the offset into the file that is managed by the virtual address space manager. The amount of offset corresponds to the amount of offset that the managed child atom of the sample table atom is offset in the file. The amount of offset is specified in the file and can be retrieved from the file. The process advances from the state 920 to a state 930.

In the state 930, the process sets the size of the virtual address space that is managed by the virtual address space manager. The size of the selected child atom of the sample table atom is specified in the file and can be retrieved from the file. The process advances from the state 930 to a state 940.

In the state 940, the process loads the page to the SMS cache 302. In one embodiment, the virtual address space manager initiates the load of the page by requesting a page of data (or less if atom size is smaller than a page) at an offset of 0. The initialization process then ends and further details of retrieving data with the virtual address space manager are described in connection with FIG. 10.

Managing Data with a Virtual Address Space Manager

Figure 10:
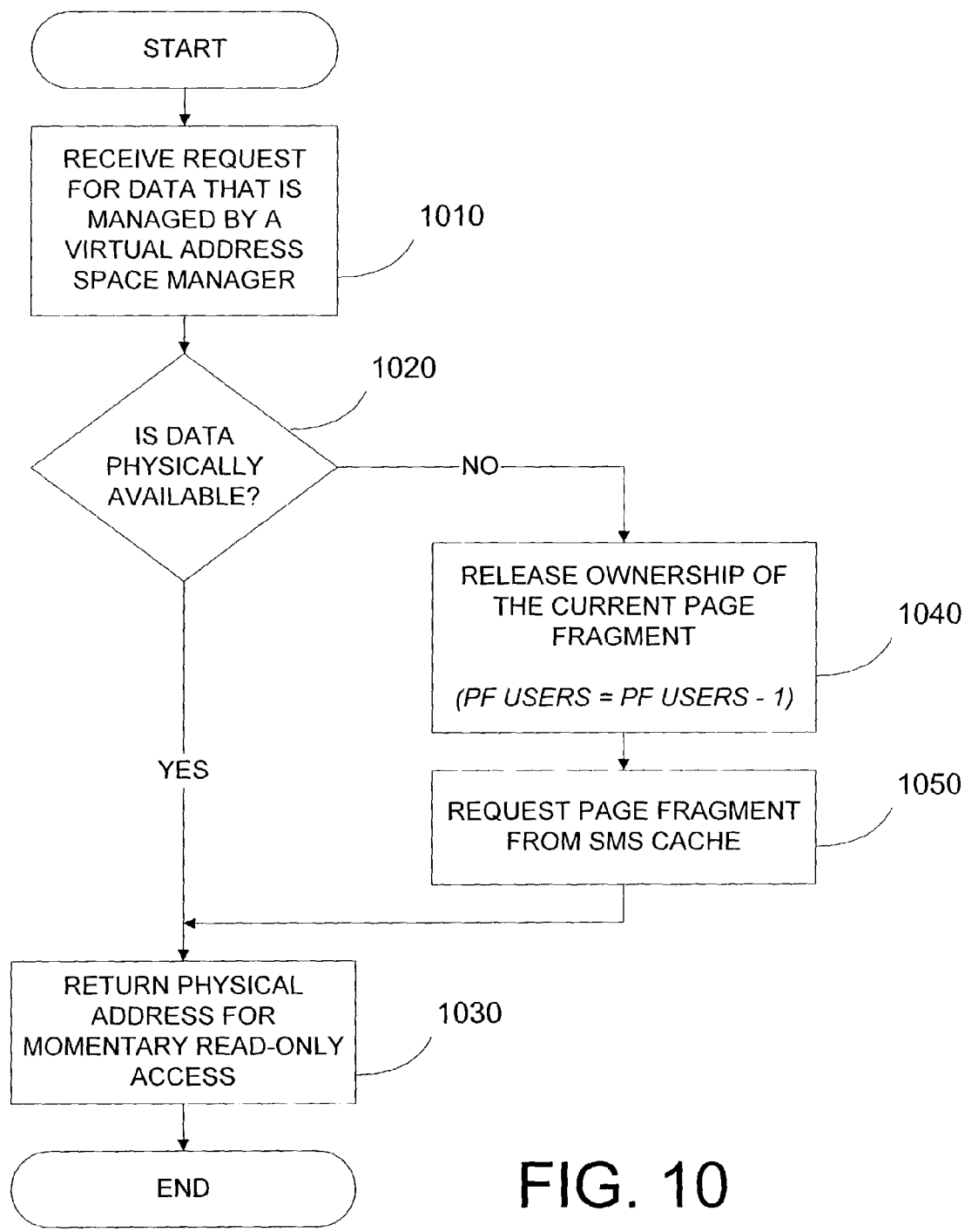
FIG. 10 is a flowchart that generally illustrates a process performed by a virtual address space manager on an ongoing basis.

FIG. 10 is a flowchart that generally illustrate a process of managing data with a virtual address space manager. At the start of the process, a virtual address space has been allocated, and the virtual address space manager has been initialized by, for example, the initialization process described earlier in connection with FIG. 9. The process for managing data starts at a state 1010.

In the state 1010, the process receives a request for data that it manages. The request can come from, for example, a file reader. For example, the virtual address space manager can receive a request for data for a selected child atom of a sample table atom. The requested data or page fragment will typically be much smaller than the size of a corresponding page in the cache. In one embodiment, the request specifies the data by offset and size. The process advances from the state 1010 to a decision block 1020.

In the decision block 1020, the process determines whether the requested data is physically available in the linked page fragment from the SMS cache 302. The process proceeds from the decision block 1020 to a state 1030 when the data is available in the SMS cache 302. Otherwise, the process proceeds from the decision block 1020 to a state 1040 and to a state 1050, before proceeding to the state 1030, which will be described in greater detail later.

In the state 1040, the process releases ownership of the page fragment object that the virtual address space manager had previously been using. Advantageously, the releasing of ownership occurs after the process has determined in the decision block 1020 that the data is not available in the linked page fragment. By contrast, a software object other than a virtual address space manager can release ownership as soon as it has completed accessing data. The delayed releasing of ownership keeps data that is relatively frequently accessed, such as child atom data of sample table atoms, in the SMS cache 302 for advantageously high hit rates. By postponing the release of ownership of the page fragment object, the virtual address space manager maintains a relatively "long-term" link to the page, maintains a user count for the page to keep the page in the used state 252, and prevents the page from being released such that pages of data that are relatively frequently accessed stay in the SMS cache 302. The release of the page fragment object decrements the user count of the page fragment object. One process for releasing a page fragment object was described in greater detail earlier in connection with FIG. 8C. The process advances from the state 1040 to the state 1050.

In the state 1050, the process requests a page fragment object from the SMS cache 302 to access a page that contains the desired data. In one embodiment, the process requests a page fragment object in the size of 64 kB, which will typically be larger than the size of data requested by the requester. One process for accessing such a page was described in greater detail earlier in connection with FIG. 8B1. The process advances from the state 1050 to the state 1030.

Returning now to the state 1030, the process returns the physical address to the requestor of data for momentary read-only access to the SMS cache 302. This physical address maps the requested data from the virtual address space to the actual physical address and is valid until the next request for data to the virtual address space manager.

Releasing Unused Segments in the SMS Cache

Figure 11:
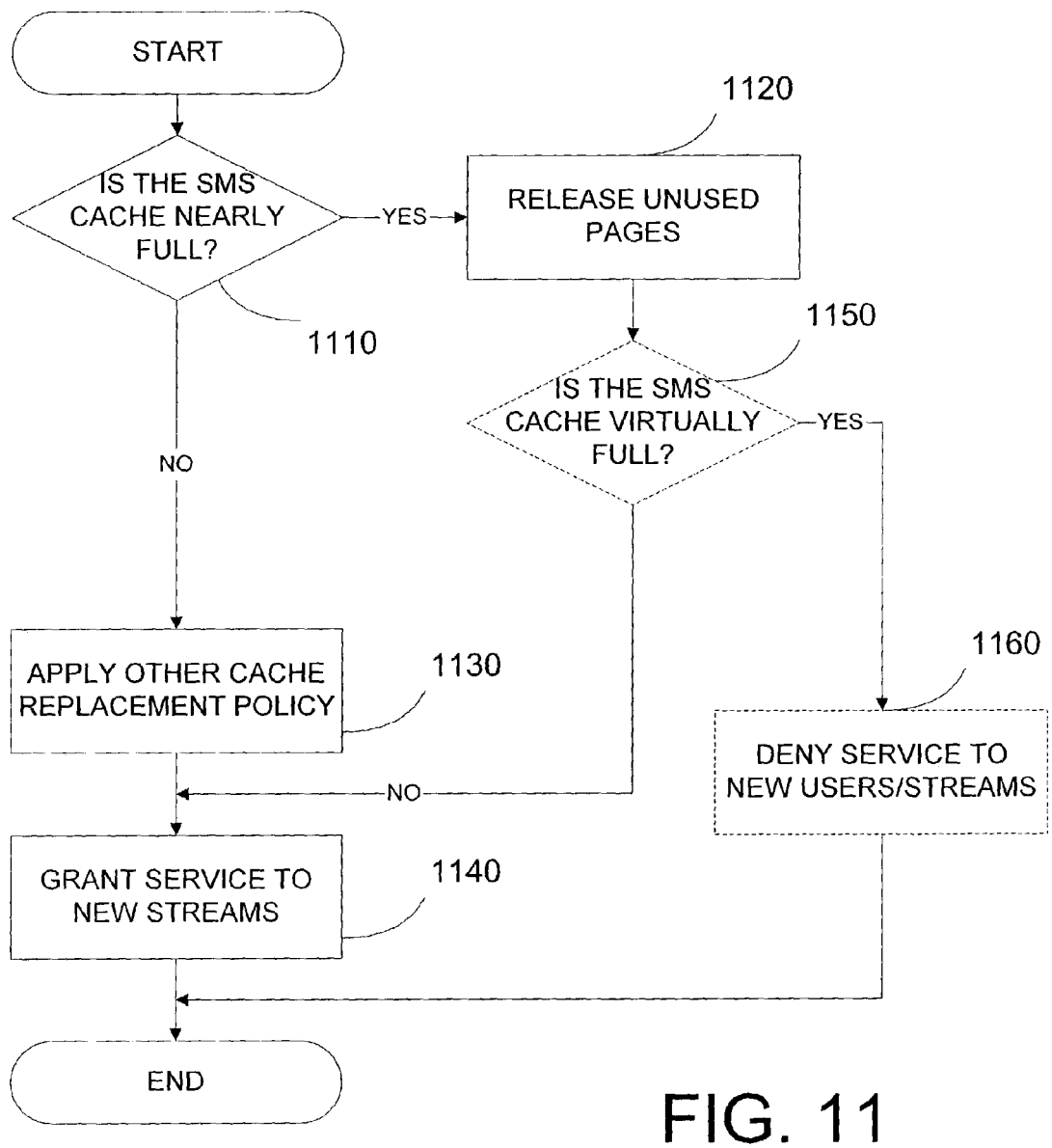
FIG. 11 is a flowchart that generally illustrates a process for releasing unused pages in the SMS cache.

FIG. 11 is a flowchart that generally illustrates a process for releasing unused segments in the SMS cache 302. It will be appreciated by the skilled practitioner that the illustrated process can be modified in a variety of ways. For example, in another embodiment, various portions of the illustrated process can be combined, can be rearranged, can be removed, and the like. The illustrated process can be used to maintain an adequate number of segments in the released state 250. The process can be invoked in many ways. For example, the process can be performed periodically, can be performed in response to a condition, such as an interrupt, can be performed when data is moved into the SMS cache 302, in response to a relatively large number of page faults (rapid swapping of pages or segments), etc.

The process starts at a decision block 1110. In the decision block 1110, the process determines whether to release unused segments so that the released segments can be used to cache new data. The process proceeds from the decision block 1110 to a state 1120 when the SMS cache 302 is nearly full, such as at least a first level full. In one embodiment, the threshold for the first level is the same as that used in an optional decision block 1150, which will be described later. When the SMS cache 302 is not nearly full, the process proceeds from the decision block 1110 to a state 1130.

In the state 1120, there are relatively few segments in the released state 250, and in one embodiment, the process releases relatively many segments that are in the unused state 254. In one embodiment, the state 1120 corresponds to an emergency flush that can help to prevent the SMS cache 302 from becoming full, and the process releases all unused segments, i.e., transitions all segments in the unused state 254 to the released state 250. By releasing an unused segment, the address space for the segment becomes available to cache new data.

As described earlier in connection with FIGS. 2B and 4, one embodiment of the process uses a count field, such as the number of users field 410, to determine whether a particular segment is in a used state 452 or is in an unused state 454. The process can release a segment from the SMS cache 302 by, for example, setting a flag in the released field 412 of a corresponding record as described earlier in connection with FIG. 4. In one embodiment, the process releases segments holding both sample table atom data and other data, such as media data and hint track data, in the state 1120. The process advances from the state 1120 to the optional decision block 1150. Where the optional decision block 1150 is not present, the process advances from the state 1120 to a state 1140.

In the optional decision block 1150, the process determines whether to deny service of additional streams of media presentations to new or existing clients in response to the relative fullness of the cache, i.e., in response to how much of the cache is occupied. This can advantageously prevent the server system 100 from bogging down via thrashing and excessive page faults, and help the server system 100 to continue to service existing data streams. When the cache is virtually full, e.g., nearly full or completely full, the process proceeds from the optional decision block 1150 to an optional state 1160. When the cache is less than virtually full, the process proceeds from the optional decision block 1150 to the state 1140. In one embodiment, a measure of the relative fullness is determined by counting the number of segments that are not in the released state 250 and comparing the count to a predetermined number or by tracking an amount of usage (in bytes) of the cache. In one embodiment, the relative fullness for a virtually full condition is at least about 1 gigabyte full. However, other levels will be readily determined by one of ordinary skill in the art, and it will be understood that the thresholds can vary with the size of the cache itself.

In the optional state 1160, the process uses the indication that the SMS cache 302 is virtually full to deny the start of service of a media presentation to a new or existing client. This can help to avoid an undesirable thrashing condition, i.e., an excessive amount of paging from mass storage to the SMS cache 302. The process can then end and can be repeated as desired.

Returning now to the state 1130, at this point in the process, the process has determined that the SMS cache is not nearly full. In the state 1130, the process releases selected segments in the SMS cache 302 in accordance with non-emergency purge replacement policies. The state 1130 can be performed periodically or in response to an event, such as the addition of a segment. When more space is needed in the SMS cache 302, a cache replacement policy can be used to select which stale segment from among the unused segments is to be released next. The replacement policy or reaping algorithm can be selected from a broad variety of replacement policy techniques. Examples of replacement policies include most recently unused, swap on miss, least recently unused (LRU), first in first out (FIFO), and the like. A replacement policy can free a segment from the cache that has gone unused for a relatively long period of time. In one embodiment, the criteria for releasing and/or removing a segment from the SMS cache varies with the relatively fullness of the SMS cache, such that the replacement policy can progressively release more unused segments of the cache when the cache fills up with used and unused segments. The process advances from the state 1130 to the state 1140. In the state 1140, the process grants service to new users and/or streams of media presentations. The process can then end and can be repeated as desired.

Embodiments of the invention advantageously provide efficient cache management techniques that can permit a server to provide service to relatively many clients. For example, in the context of the server system 100, the caching techniques disclosed herein can permit the server system 100 to provide streams of MPEG-4 media presentations to relatively many clients while advantageously avoiding the repeated paging of data from mass storage to the cache.

Various embodiments of the invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

I claim:

1. A tiered caching system for mass storage comprising:
   a shared multifile segment (SMS) cache adapted to store data from the mass storage in a plurality of segments; and
   a plurality of virtual address space managers, where a virtual address space manager is adapted to communicate with a software module that requests data of an identifiable type and is adapted to translate the request for data to the SMS cache, where the virtual address space manager is further configured to maintain a link to a corresponding segment of data in the SMS cache after the requested data from the SMS cache has been delivered.

2. The tiered caching system of claim 1, wherein the requested data corresponds to a selected child atom of a sample table atom, and where the virtual address space manager is further configured to manage a virtual address space that covers the body of the selected child atom and is further configured to translate virtual addresses of the virtual address space to actual addresses of the SMS cache.

3. The tiered caching system of claim 2, wherein the size of data requested by the virtual address space manager is a predetermined fixed size.

4. The tiered caching system of claim 1, wherein the virtual address space manager is configured to maintain the link to the segment until the data requested by the software component is not contained within the segment.

5. The tiered caching system of claim 1, wherein the virtual address space manager is configured to control access to data selected from at least one of a chunk map atom (stsc), a composition time atom (ctts), a chunk offset atom (stco), a key-frames atom (stss), a decode time atom (stts), a priority map atom (stdp), or a size map atom (stsz).

6. The tiered caching system of claim 1, wherein the virtual address space manager is configured to control access to data selected from the group consisting of: a chunk map atom (stsc), a composition time atom (ctts), a chunk offset atom (stco), a key-frames atom (stss), a decode time atom (stts), a priority map atom (stdp), or a size map atom (stsz).

7. The tiered caching system of claim 1, wherein the data of selected identifiable type corresponds to a portion of metadata but not to media data.

8. A server comprising:
   mass storage configured to store a plurality of files of a streamable format;
   a shared multifile segment (SMS) cache coupled to the mass storage, where the SMS cache is configured to store a plurality of segments of data from the mass storage, where a segment in the SMS cache is accessed by the CPU to provide data to one or more clients; and
   a CPU configured to provide a stream of data to a client over a network, where the CPU is configured to retrieve data for the stream of data from the SMS cache, where an identifiable portion of a file format is mapped in virtual memory and can be retrieved from the SMS cache, where another portion of the file format is not mapped in virtual memory but can be retrieved from the SMS cache.

9. The server of claim 8, wherein the CPU is further configured to form a file reader to retrieve data for each stream of data.

10. The server of claim 8, wherein the CPU is configured to retrieve instructions stored in hint tracks and to retrieve sample table atom data in a user space, and where the CPU is further configured to dynamically form packets of data for the stream of data in accordance with the retrieved instructions in an operating system space.

11. The server of claim 8, wherein the CPU is further configured to translate virtual memory addresses for selected child atoms of sample table atoms to real addresses corresponding to segments of data in the SMS cache.

12. The server of claim 8, wherein virtual address spaces in the virtual memory are replaced in a swap-on-miss manner.

13. The server of claim 8, wherein the data correspond to at least a first type and to a second type of data, where the first type of data is managed by the CPU in the virtual memory address spaces, where the second type of data is not managed in the virtual memory address spaces, where the CPU is configured to maintain a link to a segment for the first type of data until data requested is not contained within the segment.

14. The server of claim 13, wherein the first type of data corresponds to at least one of a chunk map atom (stsc), a composition time atom (ctts), a chunk offset atom (stco), a key-frames atom (stss), a decode time atom (stts), a priority map atom (stdp), or a size map atom (stsz).

15. The server of claim 13, wherein the first type of data corresponds to data selected from the group consisting of: a chunk map atom (stsc), a composition time atom (ctts), a chunk offset atom (stco), a key-frames atom (stss), a decode time atom (stts), a priority map atom (stdp), or a size map atom (stsz).

16. The server of claim 8, wherein the mass storage corresponds to a hard disk.

17. The server of claim 8, wherein the mass storage corresponds to a redundant array of inexpensive disks (RAID).

18. The server of claim 8, wherein the SMS cache corresponds to dynamic random access memory (DRAM).

19. A method of managing data in a cache comprising:
    storing segments of data in the cache, where the segments of data are copied from mass storage, where a segment of data corresponds to one of at least a first atom type of data or a second atom type of data; and
    selectively maintaining segments in the cache at least partially in response to the type of data stored in the segment.

20. The method of claim 19, wherein the first atom type of data comprises at least one of a chunk map atom (stsc), a composition time atom (ctts), a chunk offset atom (stco), a key-frames atom (stss), a decode time atom (stts), a priority map atom (stdp), or a size map atom (stsz).

21. The method of claim 19, wherein the first atom type of data comprises a chunk map atom (stsc), a composition time atom (ctts), a chunk offset atom (stco), a key-frames atom (stss), a decode time atom (stts), a priority map atom (stdp), or a size map atom (stsz).

22. The method of claim 19, wherein the segments correspond to data from an MPEG-4 file format, further comprising distinguishing between the first atom type of data and the second atom type of data by inspecting a type identifier.

23. The method of claim 19, wherein the data corresponds to a media presentation stored in a streamable format, further comprising:
    forming data packets from the data; and
    streaming the media presentation to a client.

24. The method of claim 19, wherein the data corresponds to a media presentation stored in a streamable format, further comprising:
    communicating with a plurality of clients including a first client and a second client;
    receiving a request from the first client for a media presentation;
    receiving a request from the second client for the same media presentation;
    retrieving data from the segments of the cache to form data packets for the first client and for the second client, where at least one segment of data is shared between the first client and the second client; and
    forming data packets for streaming to the first client and to the second client.

25. The method of claim 19, wherein maintaining segments further comprises:
    using a virtual address space manager to read selected sample table atom data in the cache, where the sample table atom data is used to locate other data;
    reading hint track data from the cache to retrieve packet forming instructions; and
    sending packet forming instructions and pointers to media data stored in the cache to an operating system such that the operating system can form packets of data for streaming.

26. A computer-readable medium having computer-executable instructions for managing a cache comprising:
    a module adapted to store segments of data in the cache, where the segments of data are copied from mass storage, where a segment of data corresponds to one of at least two atom types of data termed a first atom type of data and a second atom type of data; and
    a module adapted to selectively maintain a segment from the cache at least partially in response to the atom type of data stored in the segment.

27. The computer-readable medium of claim 26, wherein the first atom type of data comprises at least one of a chunk map atom (stsc), a composition time atom (ctts), a chunk offset atom (stco), a key-frames atom (stss), a decode time atom (stts), a priority map atom (stdp), or a size map atom (stsz).

28. The computer-readable medium of claim 26, wherein the first atom type of data comprises a chunk map atom (stsc), a composition time atom (ctts), a chunk offset atom (stco), a key-frames atom (stss), a decode time atom (stts), a priority map atom (stdp), or a size map atom (stsz).

29. The computer-readable medium of claim 26, wherein the data corresponds to a media presentation stored in a streamable format, further comprising:
    a module configured to communicate with a plurality of clients including a first client and a second client;
    a module configured to receive a request from the first client for a media presentation;
    a module configured to receive a request from the second client for the same media presentation;
    a module configured to retrieve data from the segments of the cache to form data packets for the first client and for the second client, where at least one segment of data is shared between the first client and the second client; and
    a module configured to form data packets for streaming to the first client and to the second client.

30. A method of managing a cache comprising:
    storing segments of data in the cache, where the segments are copied from mass storage, where the segments correspond to a first type of data or to a second type of data;
    forming long-term links to segments corresponding to the first type of data, where the long-term links persist even when data is not being extracted from the corresponding segments;
    forming short-life links to segments corresponding to the second type of data, where short-life links are formed when data from the segments from the cache are accessed, where a short-life link is automatically removed when data is no longer extracted from the corresponding segments; and
    inhibiting a release of a segment in the cache when a link to the segment is present.

31. The method of claim 30, wherein the first type of data corresponds to selected child atoms of a sample table atom.

32. The method of claim 30, wherein forming long-term links further comprises creating a page fragment object for a requested amount of data.

33. The method of claim 32, further comprising removing a long-term link to the segment when the requested amount of data no longer maps to the segment by releasing the page fragment object.

34. The method of claim 30, further comprising mapping a requested amount of data from a virtual address to a physical address, and replacing a virtual address space in a swap-on-miss manner when the requested amount of data no longer maps to the segment.

35. A computer-readable medium having computer-executable instructions for managing a cache comprising:
a module adapted to store segments of data in the cache, where the segments are copied from mass storage, where the segments correspond to at least two types of data termed a first type of data and a second type of data, wherein the segments of data in the cache can be shared among a plurality of clients;
a module adapted to form long-term links, where the long-term links persist when data is not extracted from the corresponding segments;
a module adapted to form short-life links to segments corresponding to the second type of data, where short-life links are formed when data from the segments from the cache are streamed to a client by a CPU, where a short-life link is removed when data is no longer extracted from the corresponding segments; and
a module adapted to inhibit a release of a segment in the cache when a link to the segment is present.

36. The computer-readable medium of claim 35, wherein the first type of data corresponds to selected child atoms of a sample table atom.

37. The computer-readable medium of claim 35, further comprising a module adapted to form a long-term link by creating and transferring ownership of a page fragment object for the segment.

38. A method of inhibiting release of segments in a cache, the method comprising:
receiving a request for data, where the requested data corresponds to a type of data that is selected for inhibited release;
determining whether the data is physically available in a first segment of the cache;
releasing ownership of a first page fragment object when the data is not available in the cache such that release of the first segment is inhibited, where the first page fragment object is linked to the first segment and is used to retrieve data from the first segment; and
requesting ownership of a second page fragment object such that the requested data is available to be retrieved from a second segment in the cache when the data is not physically available in the first segment of the cache.

39. The method of claim 38, further comprising providing a physical address for the requested data, where the physical address corresponds to an address within the cache.

40. The method of claim 38, wherein releasing ownership of the first page fragment object further comprises decrementing a user count associated with the first page fragment object.

41. The method of claim 40, further comprising destroying the first page fragment object when the user count indicates that the first page fragment object has no users.

42. The method of claim 41, further comprising:
incrementing a user count associated with a segment when a page fragment object is created;
decrementing the user count associated with the segment when the page fragment object is destroyed;
inhibiting the release of the segment when the segment is in a used state, where the used state corresponds to a non-zero user count; and
permitting the release of the segment when the segment is in an unused state, where the unused state corresponds to a zero user count.

43. The method of claim 38, further comprising:
selecting an unused segment by applying a cache replacement policy to unused segments; and
releasing the selected segment such that the released segment can be used for new data.

44. The method of claim 38, further comprising:
determining when an amount of occupied space in the cache exceeds a predetermined threshold; and
releasing all segments of an unused state in response to the determination that the amount of occupied space exceeds the predetermined threshold.

45. The method of claim 38, further comprising:
determining when an amount of occupied space in the cache exceeds a predetermined threshold; and
denying service to a data stream in response to the determination that the amount of occupied space exceeds the predetermined threshold.

46. The method of claim 38, further comprising:
determining when an amount of occupied space in the cache is below a predetermined threshold; and
granting service to a data stream in response to the determination that the amount of occupied space is below the predetermined threshold.

47. A cache management system comprising:
a means for receiving a request for data, where the requested data corresponds to a type of data that is selected for inhibited release;
a means for determining whether the data is physically available in a first segment of the cache;
a means for releasing ownership of a first page fragment object when the data is not available in the cache such that release of the first segment is inhibited, where the first page fragment object is linked to the first segment and is used to retrieve data from the first segment; and
a means for requesting ownership of a second page fragment object such that the requested data is available to be retrieved from a second segment in the cache when the data is not physically available in the first segment of the cache.

48. The cache management system of claim 47, further comprising a means for providing a physical address for the requested data, where the physical address corresponds to an address within the cache.

49. A computer-readable medium having computer-executable instructions for managing a cache comprising:
a module adapted to receive a request for data, where the requested data corresponds to a type of data that is selected for inhibited release;
a module adapted to determine whether the data is physically available in a first segment of the cache;
a module adapted to release ownership of a first page fragment object when the data is not available in the cache such that release of the first segment is inhibited, where the first page fragment object is linked to the first segment and is used to retrieve data from the first segment; and
a module adapted to request ownership of a second page fragment object such that the requested data is available to be retrieved from a second segment in the cache when the data is not physically available in the first segment of the cache.

50. The computer-readable medium of claim 49, further comprising a module adapted to provide a physical address for the requested data, where the physical address corresponds to an address within the cache.

51. The computer-readable medium of claim 49, wherein the module adapted to release ownership of the first page fragment object is further configured to:
    decrement a user count associated with the first page fragment object;
    destroy the first page fragment object when the user count indicates that the first page fragment object has no users;
    increment a user count associated with a segment when a page fragment object is created;
    decrement the user count associated with the segment when the page fragment object is destroyed;
    inhibit the release of the segment when the segment is in a used state, where the used state corresponds to a non-zero user count; and
    permit the release of the segment when the segment is in an unused state, where the unused state corresponds to a zero user count.

52. The computer-readable medium of claim 49, further comprising:
    a module adapted to determine when an amount of occupied space in the cache exceeds a predetermined threshold; and
    a module adapted to release all segments of an unused state in response to the determination that the amount of occupied space exceeds the predetermined threshold.

53. The computer-readable medium of claim 49, further comprising:
    a module adapted to determine when an amount of occupied space in the cache exceeds a predetermined threshold; and
    a module adapted to deny service to a data stream in response to the determination that the amount of occupied space exceeds the predetermined threshold.

54. The computer-readable medium of claim 49, further comprising a module adapted to apply a replacement policy to select a segment to purge from the cache.

55. A method of retrieving data for streaming of media presentations to a plurality of clients, the method comprising:
    receiving a request for a media presentation;
    selecting media tracks for the media presentation;
    maintaining virtual memory address spaces for selected child atoms of sample table atoms;
    receiving a request for data for the selected child atoms;
    mapping virtual memory addresses for the selected child atoms to real addresses for a cache when data is requested; and
    using the mapped addresses to retrieve the requested data from the cache.

56. The method of claim 55, wherein a separate virtual memory address space is allocated for at least one of a chunk map atom (stsc), a composition time atom (ctts), a chunk offset atom (stco), a key-frames atom (stss), a decode time atom (stts), a priority map atom (stdp), or a size map atom (stsz).

57. The method of claim 55, wherein a separate virtual memory address space is allocated for a chunk map atom (stsc), a composition time atom (ctts), a chunk offset atom (stco), a key-frames atom (stss), a decode time atom (stts), a priority map atom (stdp), or a size map atom (stsz).

58. The method of claim 55, further comprising:
    maintaining a link to a segment of memory in the cache such that the segment is in a used state when the data in the segment corresponds to data that is requested;
    receiving a new request for data;
    determining that the data for the new request is not contained within the segment; and
    relinquishing the link to the segment of memory corresponding to the virtual memory address space.

59. The method of claim 58, further comprising updating references such that the virtual memory addresses can be translated to new real addresses for a new segment in the cache.

60. The method of claim 58, further comprising reusing the virtual memory address space allocated for the child atom such that the virtual memory address space is reused in a swap on miss manner.

61. A computer-readable medium having computer-executable instructions for retrieving data for streaming of media presentations to a plurality of clients, the computer-readable medium comprising:
    a module adapted to receive a request for a media presentation;
    a module adapted to select media tracks for the media presentation;
    a module adapted to maintain virtual memory address spaces for selected child atoms of sample table atoms;
    a module adapted to receive a request for data for the selected child atoms;
    a module adapted to map virtual memory addresses for the selected child atoms to real addresses for a cache when data is requested; and
    a module adapted to use the mapped addresses to retrieve the requested data from the cache.

62. The computer-readable medium of claim 61, wherein the module adapted to maintain virtual memory address spaces is further configured to:
    maintain a link to a segment of memory in the cache such that the segment is in a used state when the data in the segment corresponds to data that is requested;
    determine when requested data is not contained within the segment; and
    relinquish the link to the segment of memory corresponding to the virtual memory address space.

63. The computer-readable medium of claim 61, wherein the module adapted to form a virtual memory address space is further configured to form a virtual memory address space for at least one of a chunk map atom (stsc), a composition time atom (ctts), a chunk offset atom (stco), a key-frames atom (stss), a decode time atom (stts), a priority map atom (stdp), or a size map atom (stsz).

64. The computer-readable medium of claim 61, wherein the module adapted to form a virtual memory address space is further configured to form a virtual memory address space for a chunk map atom (stsc), a composition time atom (ctts), a chunk offset atom (stco), a key-frames atom (stss), a decode time atom (stts), a priority map atom (stdp), or a size map atom (stsz).

65. The method of claim 19, wherein the cache comprises solid-state memory and wherein the mass storage comprises at least one of a hard disk, a redundant array of inexpensive disks (RAID), or an optical disk.

66. The method of claim 19, wherein the mass storage comprises a persistent data store.

67. The computer-readable medium of claim 26, wherein the cache comprises solid-state memory and wherein the mass storage comprises at least one of a hard disk, a redundant array of inexpensive disks (RAID), or an optical disk.

68. The computer-readable medium of claim 26, wherein the mass storage comprises a persistent data store.

* * * * *